Inventors
F. P. GOHOREL
A. J. HENQUET
J. J. PERROT
By
Robert Harding jr.
Attorney Nov. 3, 1959   F. P. GOHOREL ET AL   2,911,477
MARKERS CONTROL FOR CROSSBAR AUTOMATIC TELEPHONE SYSTEM
Filed March 24, 1955   17 Sheets-Sheet 5

Inventors
F. P. GOHOREL
A. J. HENQUET
J. J. PERROT
By
Robert Harding Jr.
Attorney

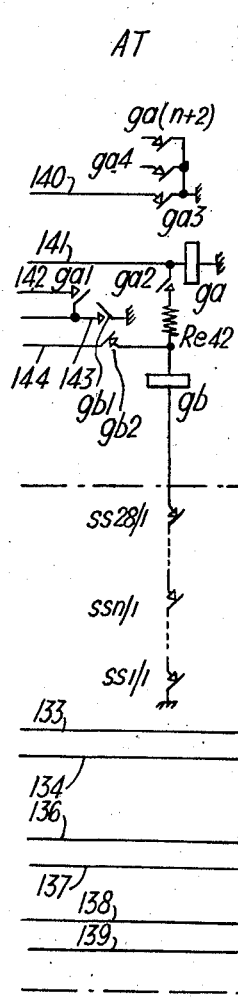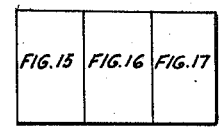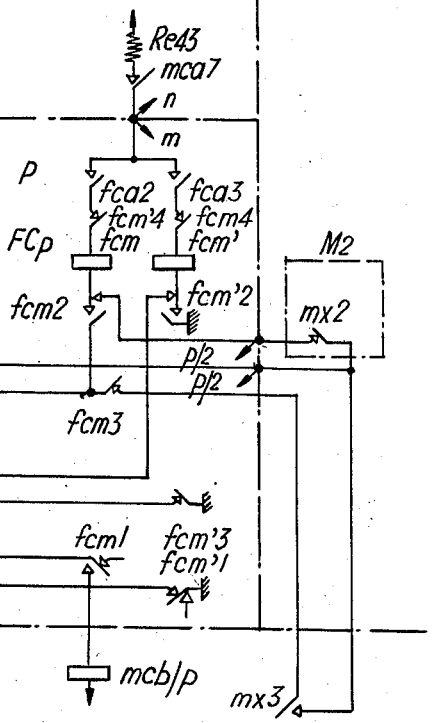

United States Patent Office 2,911,477
Patented Nov. 3, 1959

2,911,477
MARKERS CONTROL FOR CROSSBAR AUTOMATIC TELEPHONE SYSTEM

Fernand Pierre Gohorel, Antony, Andre Jean Henquet, Boulogne, and Jean Jacques Perrot, Paris, France, assignors to International Standard Electric Corporation, New York, N.Y., a corporation of Delaware Application March 24, 1955, Serial No. 496,555

Claims priority, application France April 7, 1954

12 Claims. (Cl. 179—18)

The present invention refers to improvements in automatic telephone systems and more particularly in those using crossbar type switches or multiselectors. In certain systems of this type, one or more group-selecting stages are used to choose a free line in a predetermined numerical group and hence to reach a local subscriber group, an outgoing circuit, a special service, etc., a line-selecting stage or a final stage effecting the selection of the called subscriber within his group. Each group- or line-selecting stage comprises a plurality of "elements;" in each element communication is established through one or more multiselectors controlled by common devices or "markers." Two or more markers may be provided for each selecting element so that two or more calls may be established through said element simultaneously.

In order to control the positioning of a line- or group-selecting element, the marker must receive one or more selective combinations from the register. If it is desired to send a plurality of combinations from the register to the marker simultaneously and in the shortest possible time, it is necessary to have a rather large number of conductors. Therefore, it is not possible to use the talking chain, and a direct connection or by-path is established between the register and the marker. This poses a certain number of problems. The marker is a device whose occupied time should be as short as possible; its connection to the register should therefore be very quick without however requiring a number of members whose cost would be prohibitive. It is also necessary to have means for detecting the group- or line-selecting element seized by the calling subscriber in order to establish the connection between the register and one of the markers serving said element.

One of the features of the invention is to establish the connection between the register and the marker through an intermediate member or "impulse-receiver," the number of these impulse-receivers being smaller than that of the registers and their function consisting essentially in receiving information identifying the line- or group-selecting element seized by the calling subscriber and in choosing one of the markers serving said element, switching devices such as multi-contact relays being provided for connecting the receivers and the markers two by two, these devices making it possible to simplify the register and to assure a quick connection between the digit-receiver and the marker and hence to reduce the holding time of said marker to a minimum, doing this economically.

Another feature of the invention is to divide the impulse-receivers into a plurality of groups and to assign each impulse-receiver group to a predetermined selection stage, the register choosing, for each of the successive selections, a free impulse-receiver among those corresponding to the selection involved, this division of the impulse-receivers making it possible to simplify the connecting devices between the impulse-receivers and the markers and to reduce the number of identity signals that can be received in each impulse-receiver.

Another feature of the invention lies in the fact that the impulse-receivers assigned to the line-selecting stage are themselves divided into a plurality of groups, the impulse-receivers of one and the same group giving access to the line-selecting elements serving a predetermined subscriber group.

Another feature of the invention lies in the fact that when a subscriber group is served by a single line-selecting element, the identity signal of said element is sent to the impulse-receiver from the register, this making it possible to simplify the circuit used for this transmission.

Since the functions of the impulse-receiver are more simple than those of the register, its holding time is shorter, but it is not necessary as in the case of the marker to seek a reduction in time through an increase in cost.

Another feature of the invention lies in connecting the registers to the impulse-receivers by means of switching devices such a multiselectors that can provide only one connection at a given instant, this making it possible to obtain an economical mode of connection while compatible with the permissible holding time of the impulse-receiver.

Another feature of the invention lies in the fact that when the impulse-receiver has received the identity signal of the calling line- or group-selecting element and has chosen one of the markers serving said element, this marker sends that element a signal characterizing its own identity, the same circuit being used to send these two signals in succession.

Another feature of the invention is that when two impulse-receivers are seized by two individual selectors of one and the same multiselector of a line- or group-selecting element, devices are provided to eliminate one of the two impulse-receivers so as to prevent the simultaneous routing of two calls through said mutiselector, the call received at the eliminated impulse-receiver being held waiting during the whole operating time of the other impulse-receiver.

In certain cases the number of the different members making up the exchange is so designed that it may be of interest to adopt slightly different arrangements for connecting the register to the marker.

Another feature of the invention lies in establishing the connection between the register and the marker through an intermediate member of simplified design or "selective connecting bundle," the identity signal of the calling line- or group-selecting element being received first at the register and then causing in said connecting bundle the operation of a switching device such as a relay individual to the calling selecting element, this relay being used for choosing one of the markers serving said element and this marker being connected to the register through the selective connecting bundle.

Another feature of the invention lies in dividing the registers of the exchange into a plurality of groups, each of the selective connecting bundles being assigned to a register group and serving all the markers of the exchange, so that any register can have access to all said markers.

Another feature of the invention lies in dividing the connecting devices between the registers and the markers into a plurality of classes, priority in the selection of a marker depending upon the class of the connecting device effecting the selection, this for the purpose of allowing a better distribution of traffic.

The signals capable of being sent from the register to the marker or vice versa are divided into two classes. The first, sent from the register to the marker, concern the selective combinations required for the routing of the call; they require a rather large number of conductors if it is desired to send several selective combinations at the same time and almost instantaneously. The others, sent from the marker to the register, involve different signals relative to the progress of the call, such as the following: free line, busy line, delayed selections, etc. Contrary to what happens in the case of the selective combinations, these signals can be sent during the whole operating time of the marker but require only a small number of conductors.

Another feature of the invention lies in using two different circuits for the exchange of the various signals between the register and the marker, the first circuit being used for sending the selective combinations and being released as soon as this sending has ended, the other circuit being used for the various signals concerning the progress of the call and being held during the whole operating time of the marker; the first circuit is engaged only a very short time and can be used immediately thereafter for the establishment of another connection.

Another feature of the invention is to make the second circuit consist of a multiselector cross point and the first circuit consist of the relay contacts controlling the positioning of said multiselector.

Another feature of the invention lies in using the impulse-receiver to register the selective combinations received from the register and send them to the marker in order to release quickly the connection between the register and the receiver assigned to the transmission of these combinations.

Various other features will appear from the following description, given as a nonlimitative example with reference to the accompanying drawing, in which.

Figure 2:
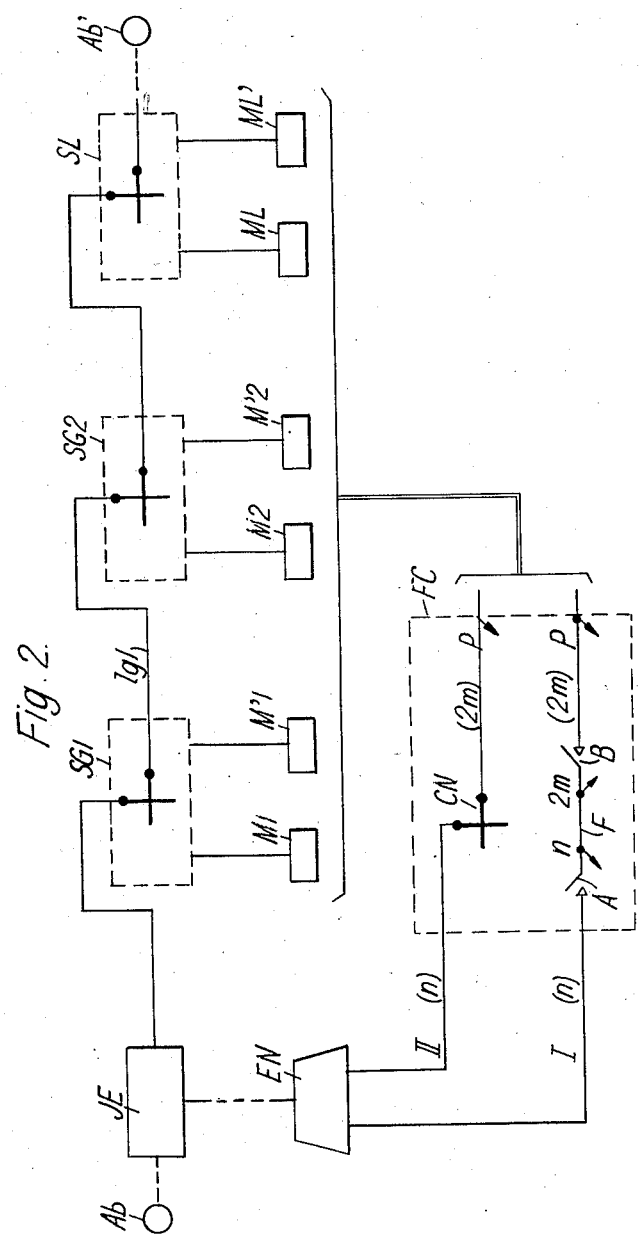
Fig. 2 is a variant of the diagram of Fig. 1 wherein two sending circuits are used between the registers and markers.
Figure 3:
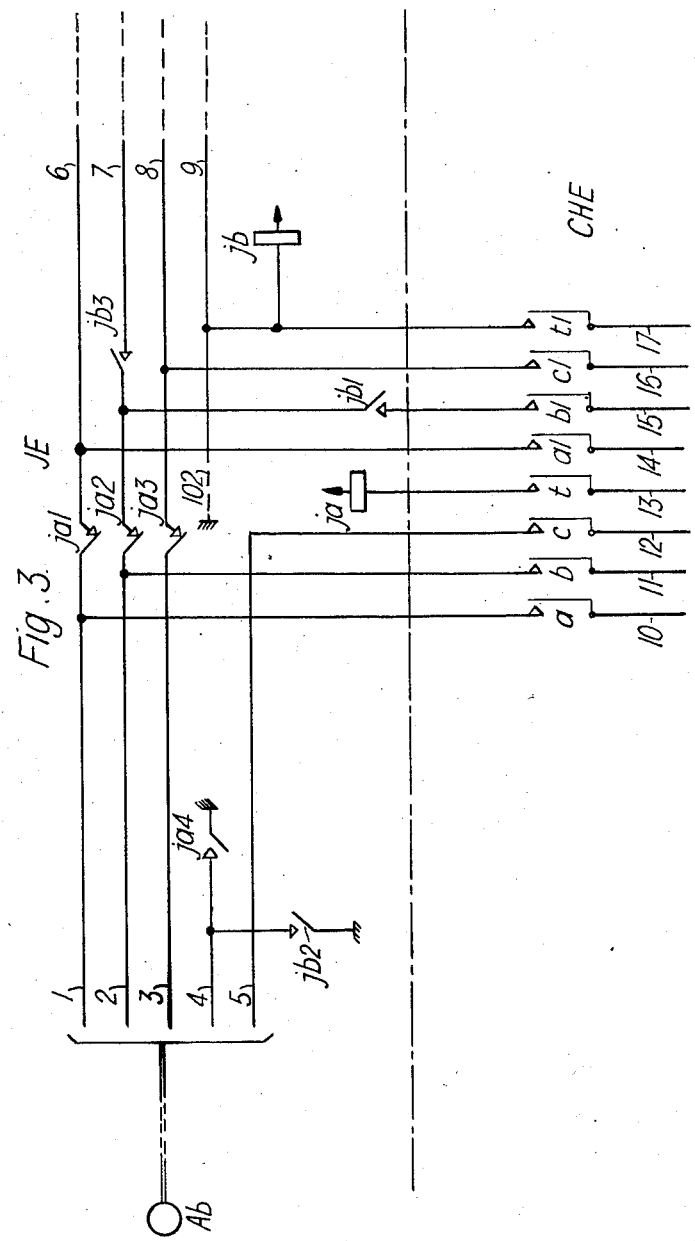
Figure 4:
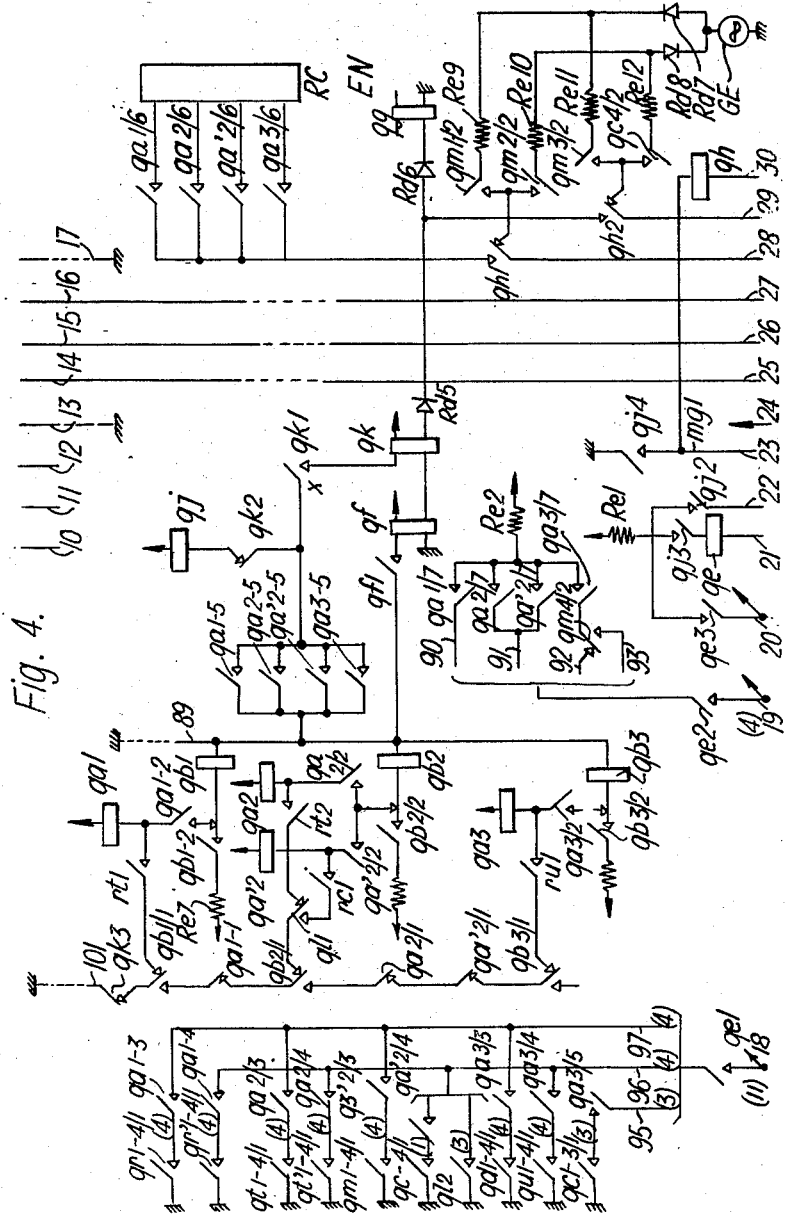
Figure 5:
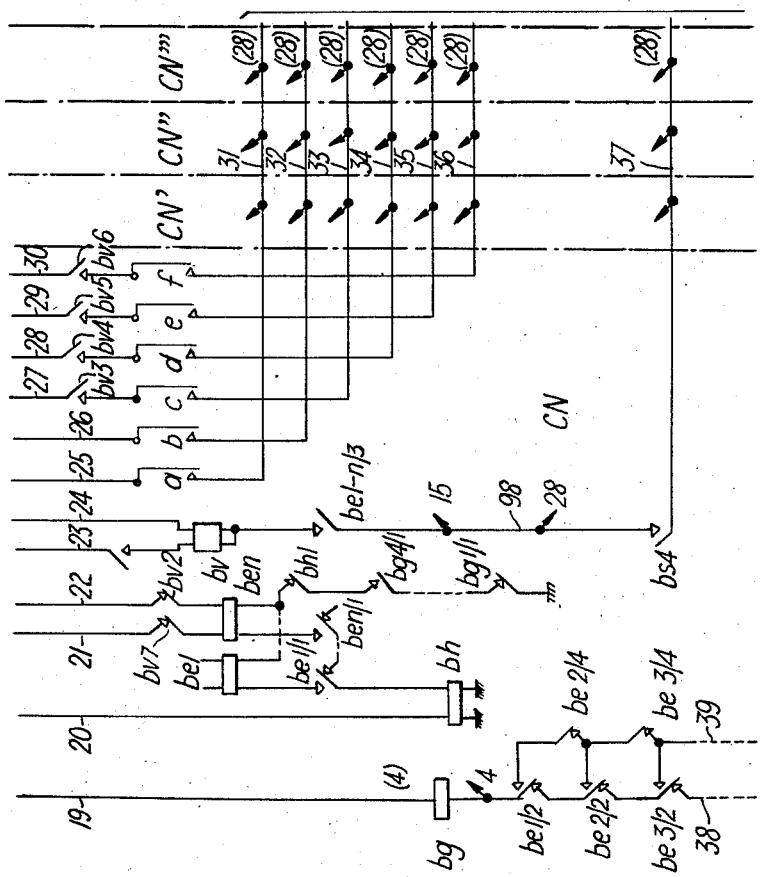
Figure 6:
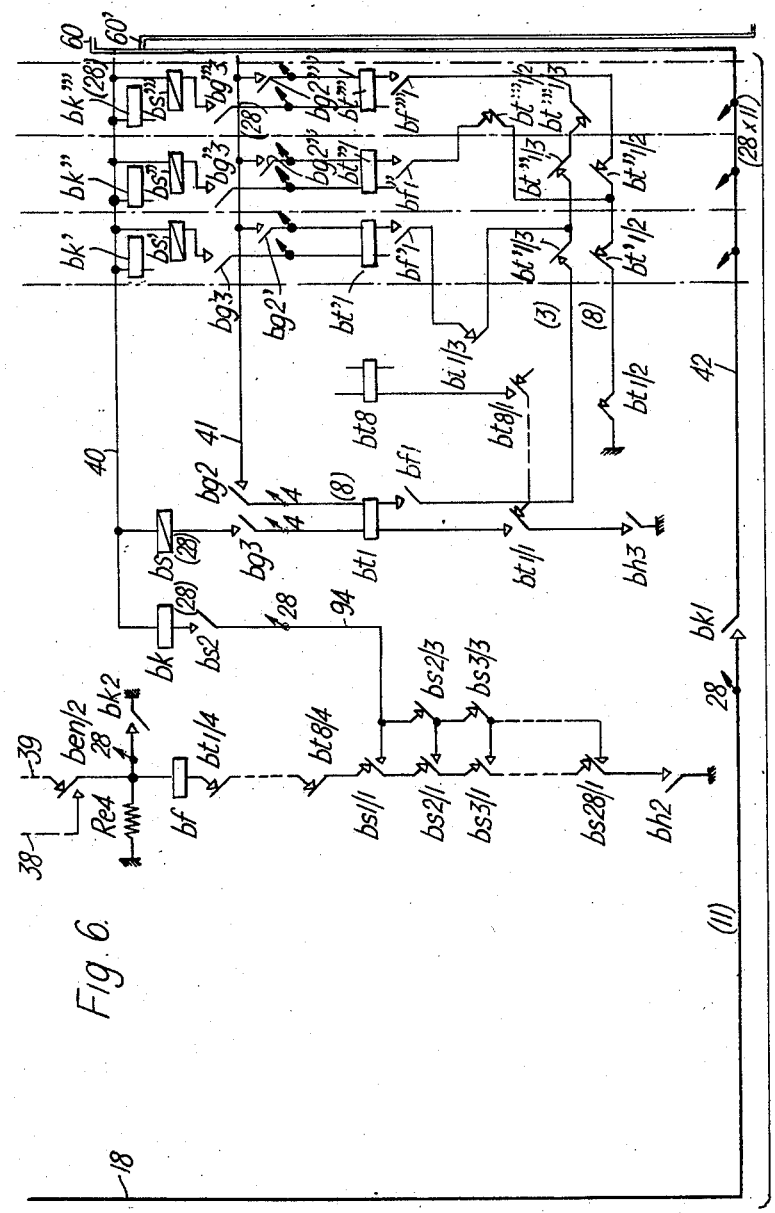
Figure 7:
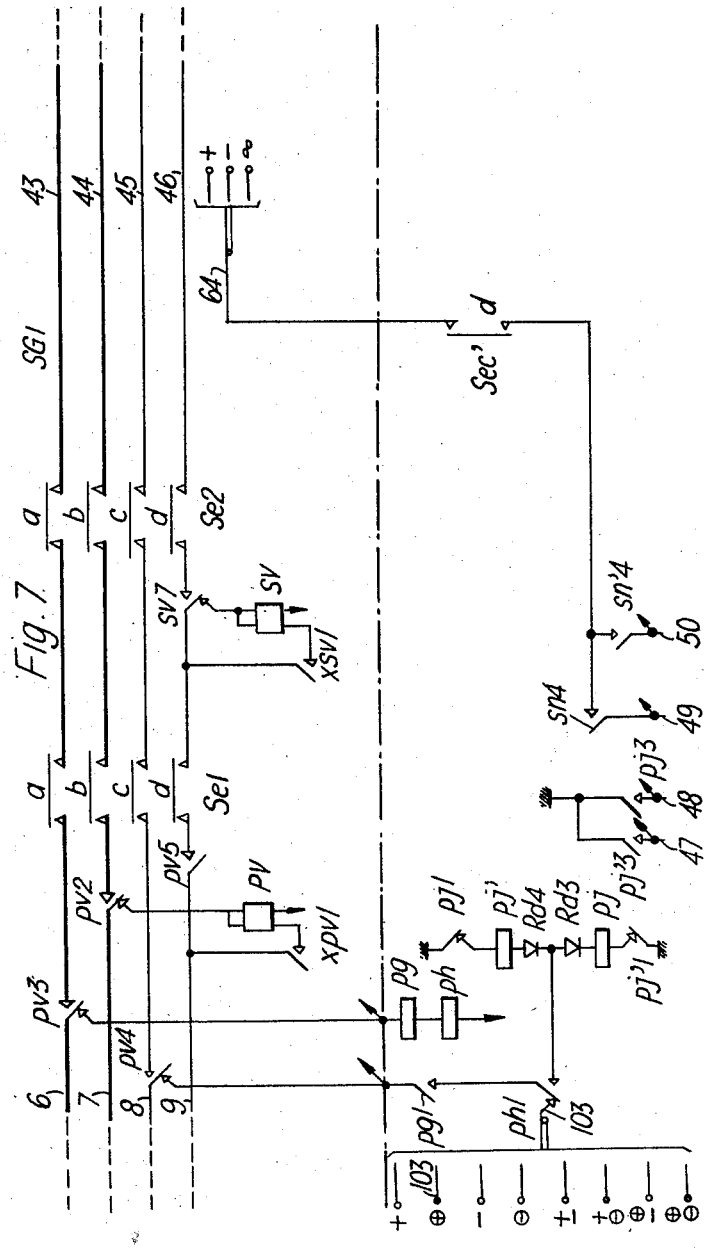
Figure 8:
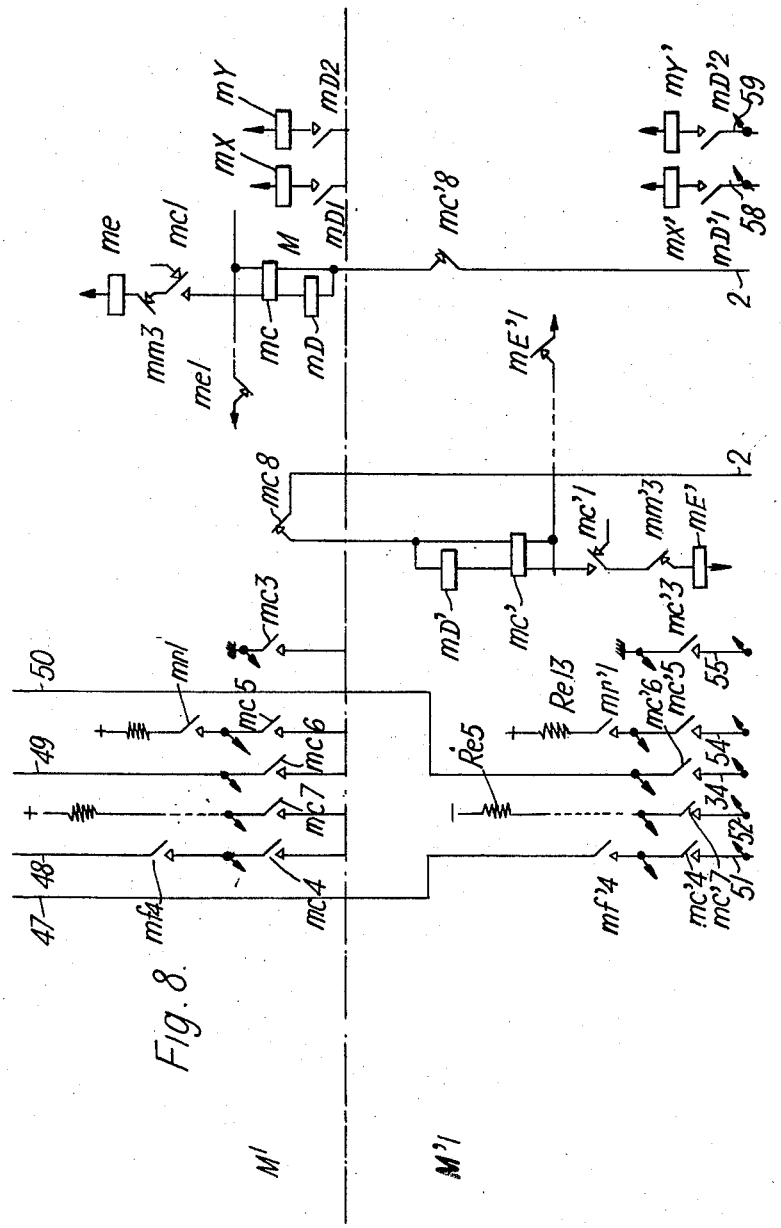
Figure 9:
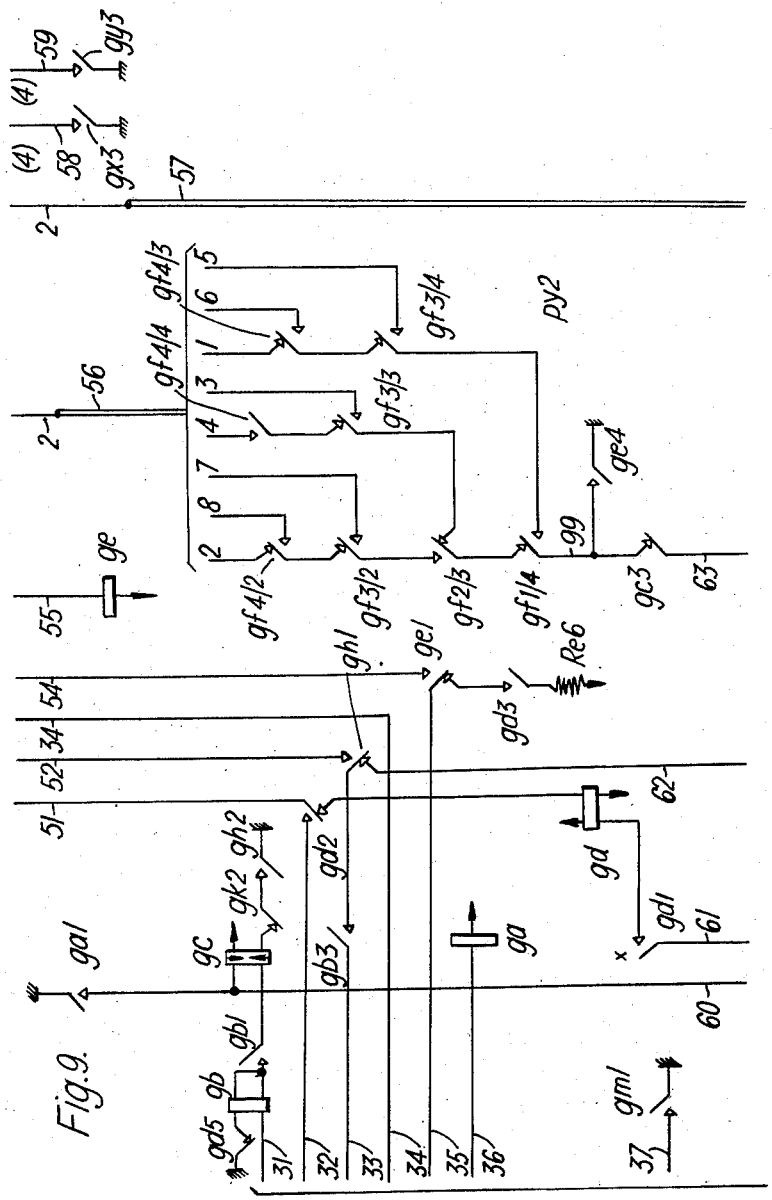
Figure 10:
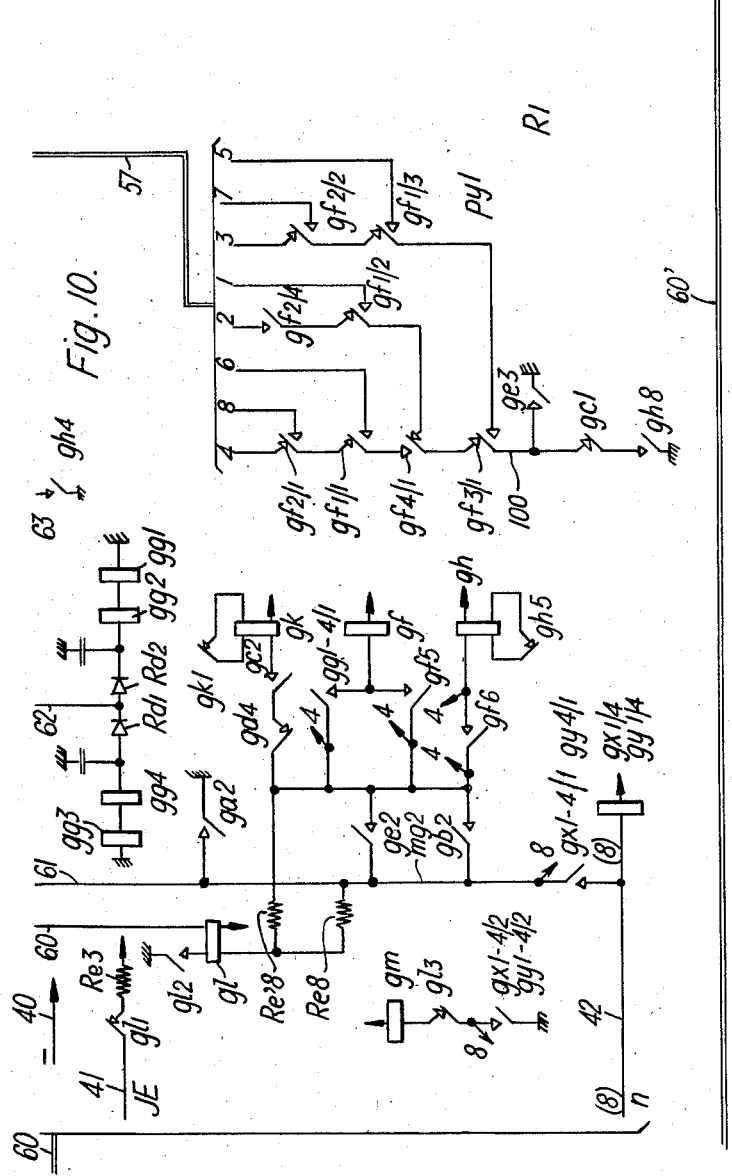
Figure 11:
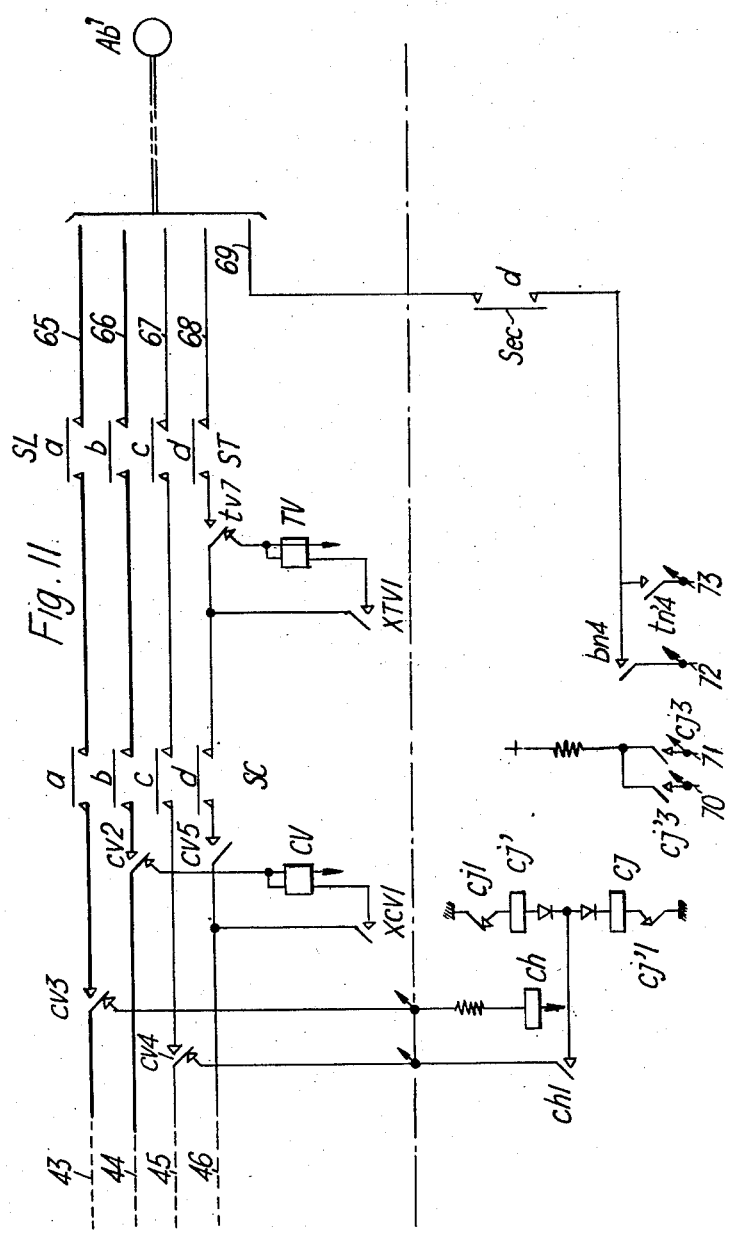
Figure 12:
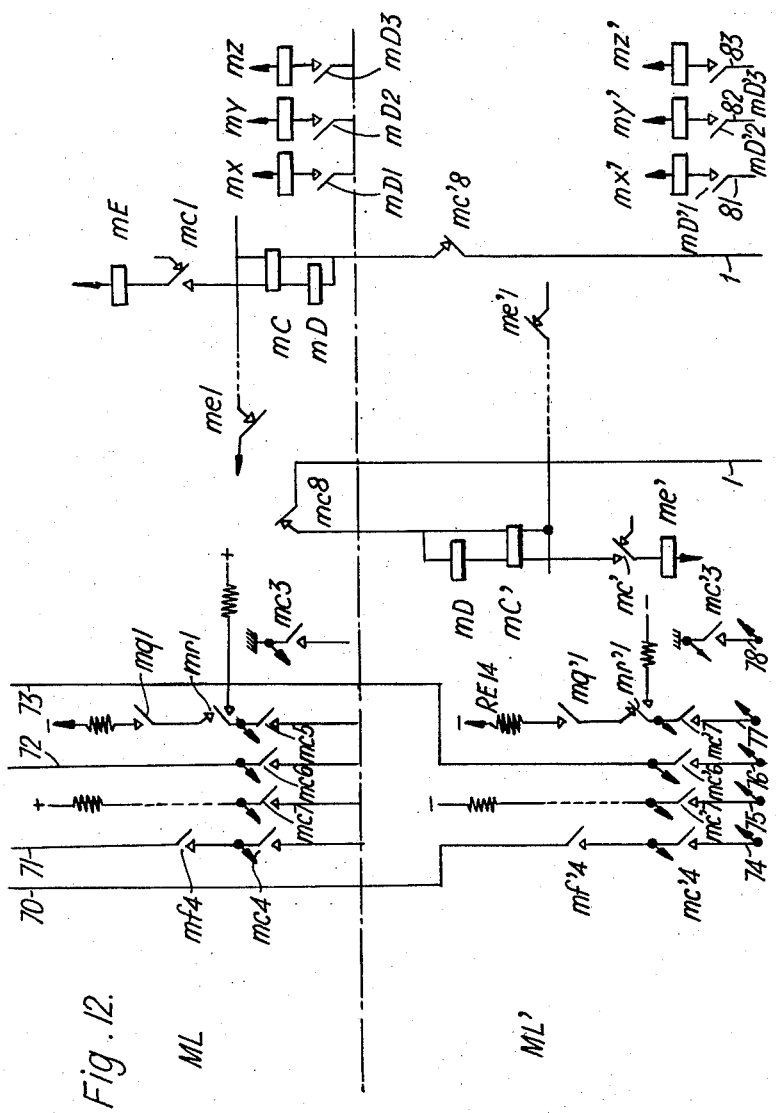
Figure 13:
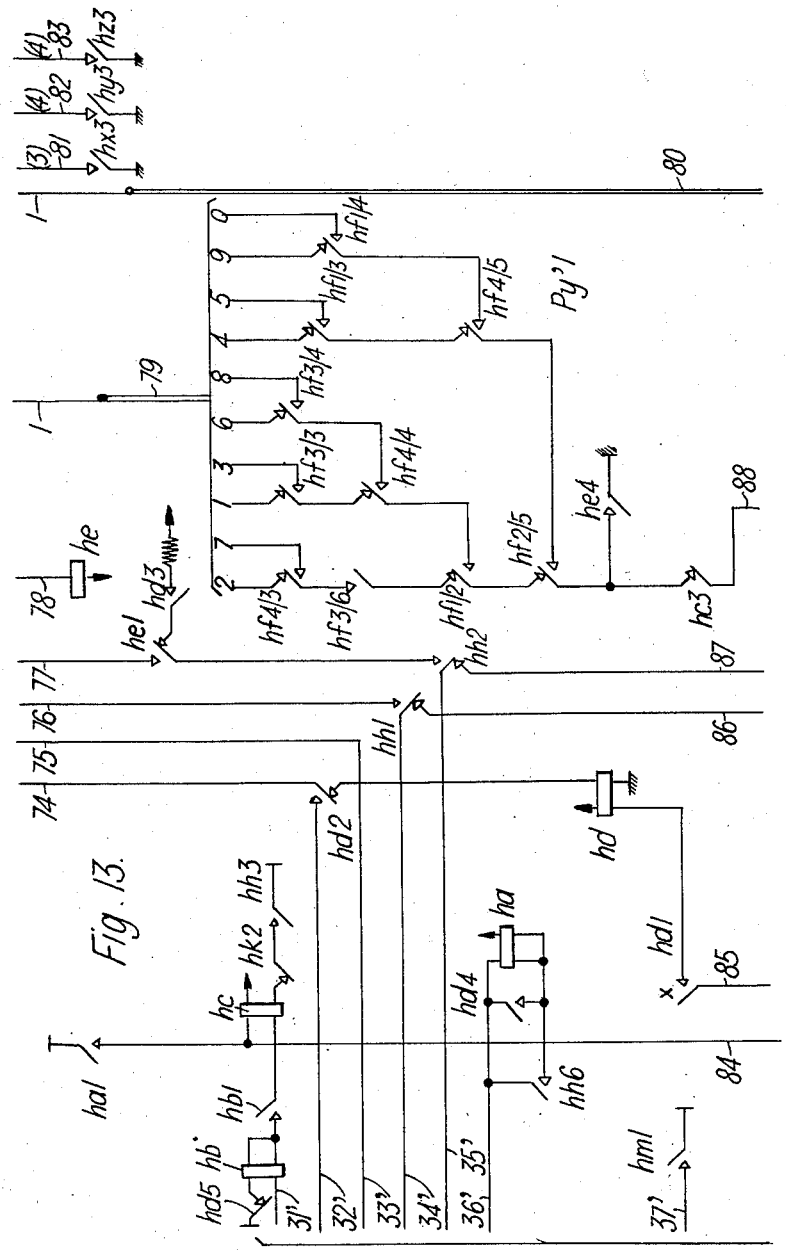
Figure 14:
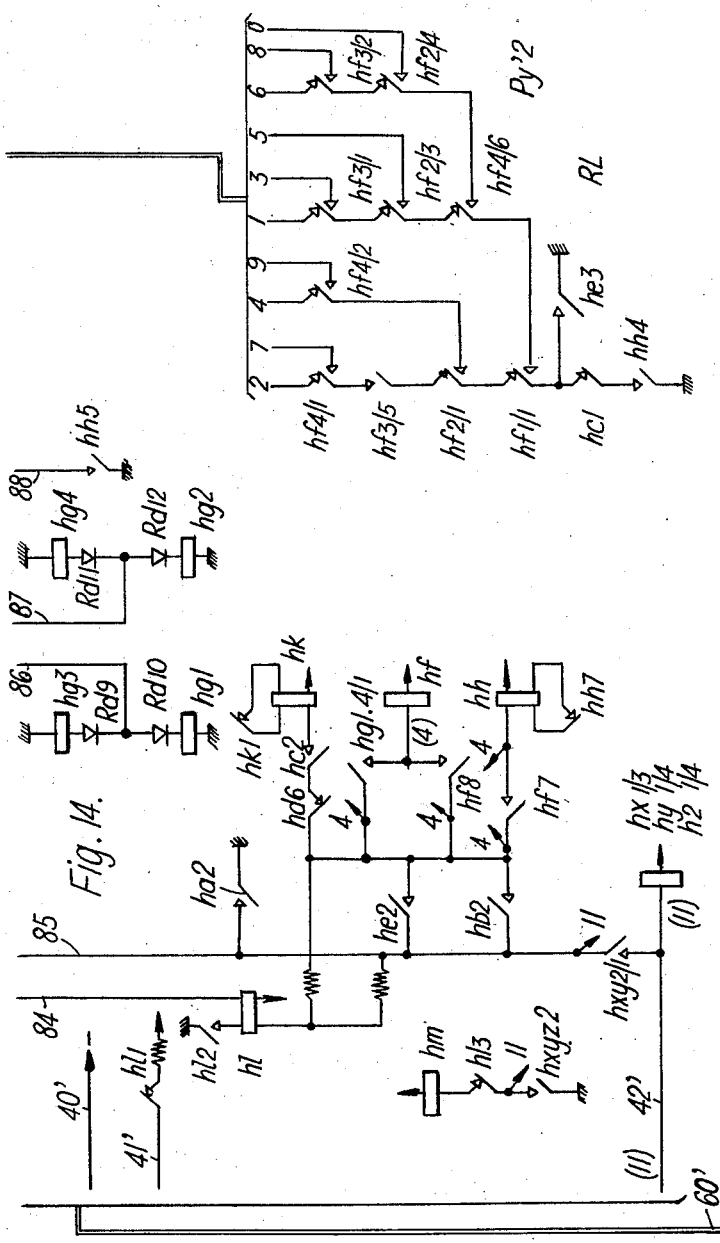
Figure 15:
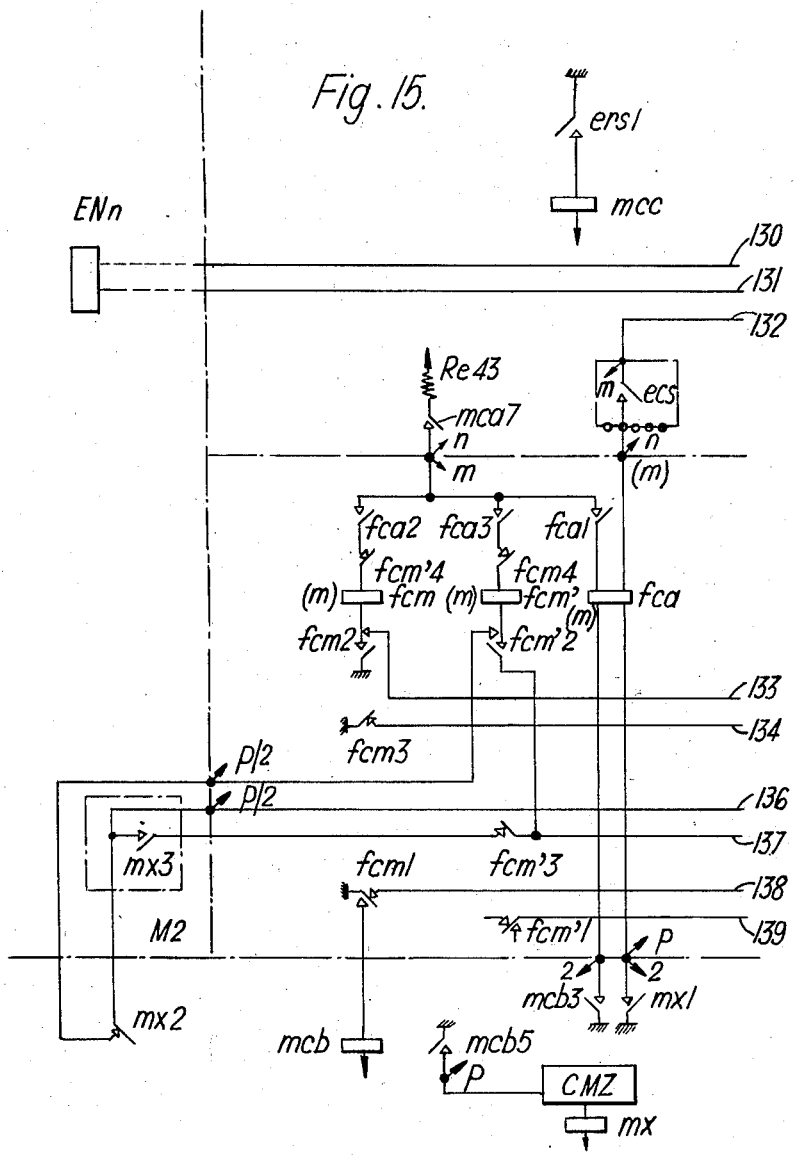
Figure 16:
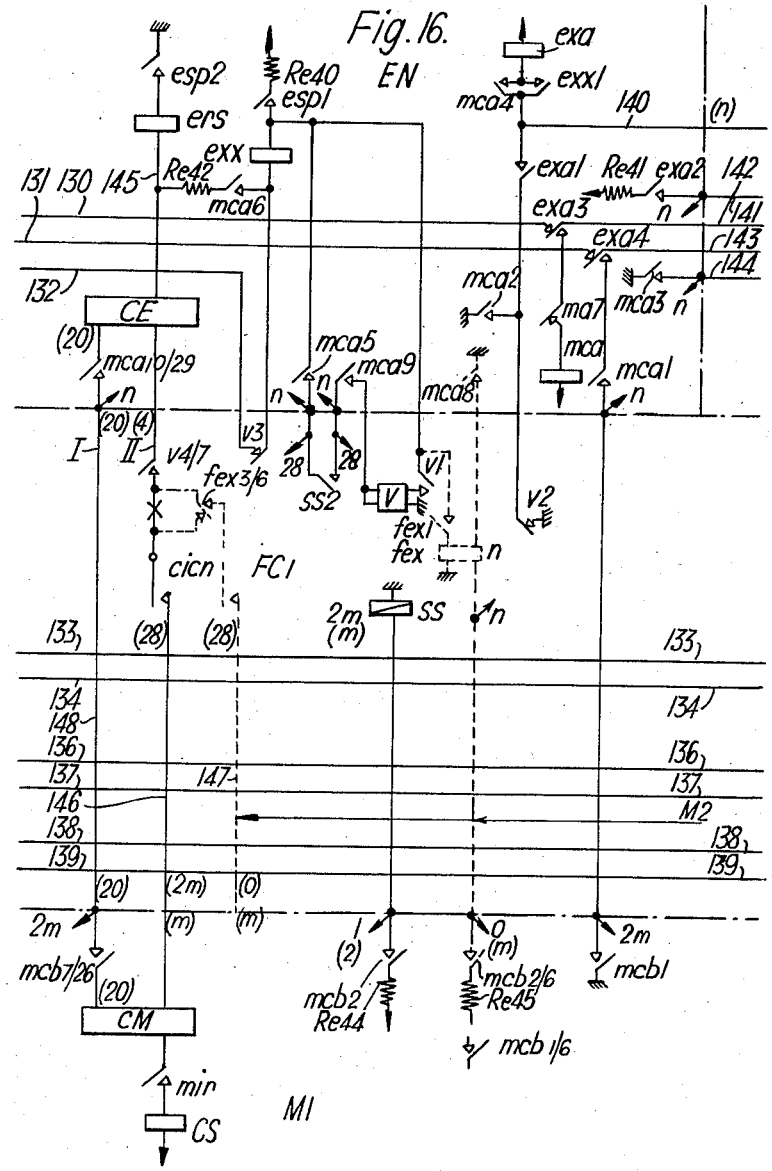

Fig. 3 shows such circuit components of a register connector as are necessary for an understanding of the invention (throughout what follows, the expression "register connector" will be used to designate all the members located between the hunting chain of the calling subscriber and the selection chain of the called subscriber and designed to effect the connection between said chains and the register);

Fig. 4 shows the circuit components of a register;

Figs. 5 and 6 are a detail schematic of a connector designed to connect the register to the impulse-receiver;

Fig. 7 shows the circuit components of a group-selecting element;

Fig. 8 shows the circuit components of two markers designed to control the group-selecting means of Fig. 7;

Figs. 9 and 10 are a detail schematic of an impulse-receiver assigned to group selection;

Fig. 11 shows the circuit components of a line-selecting element;

Fig. 12 shows the circuit components of two markers designed to control the line-selecting element of Fig. 11;

Figs. 13 and 14 are a detail schematic of an impulse-receiver assigned to the line selection;

Figs. 15 to 17 are detail schematics of a connecting device between the register and the marker corresponding to the switching diagram of Fig. 2;

Fig. 18 shows how Figs. 3 to 14 are associated;

Fig. 19 shows how Figs. 15 to 17 are associated.

The general operation of the system will now be explained with reference to the diagram of Fig. 1.

Throughout what follows it will be assumed that the switches used for the establishment of a connection are crossbar switches or multiselectors of a known type comprising a certain number of individual selectors. The selection of a predetermined outgoing line is effected by means of members called selecting bars. Each of these bars is associated with two selecting magnets and can take two operating positions depending upon the magnet energized. Upon occupying one of these positions, said bar prepares the connection of an individual selector to two outgoing lines. The selection of one of these lines is effected by causing the operation of one or the other of two magnets associated with a supplementary selecting bar or "switching magnets" according to a known principle. If the number of selecting bars excluding the supplementary bar is designated by $a$, $2a$ selecting magnets are obtained and two series of lines are selected each comprising two $a$ lines. The selection of a series of lines is effected by one of the two magnets associated with the supplementary bar; the selection of a line within the series is made by one of the two previously-mentioned $2a$ selecting magnets.

The selecting magnets only prepare the connection of an individual selector to a line, the connection itself being caused by a bar operated by a connecting or operating magnet individual to each individual selector. The connection is maintained as long as this magnet remains energized, regardless of the position of the selecting magnet that has prepared the connection. In the descriptions that follow, the term "frame" will be used to designate the set of individual selectors of one and the same multiselector and the relays used to control said selectors.

It is also possible, according to a known method, not to make use of a supplementary selecting bar for the selection of a series of lines; in that case, the number of lines among which a selection can be made is reduced to one-half, but on the other hand each of these lines comprises twice as many wires. The supplementary selecting bar can then perform the same functions as the other bars, this making it possible to select two more lines.

Figure 1:
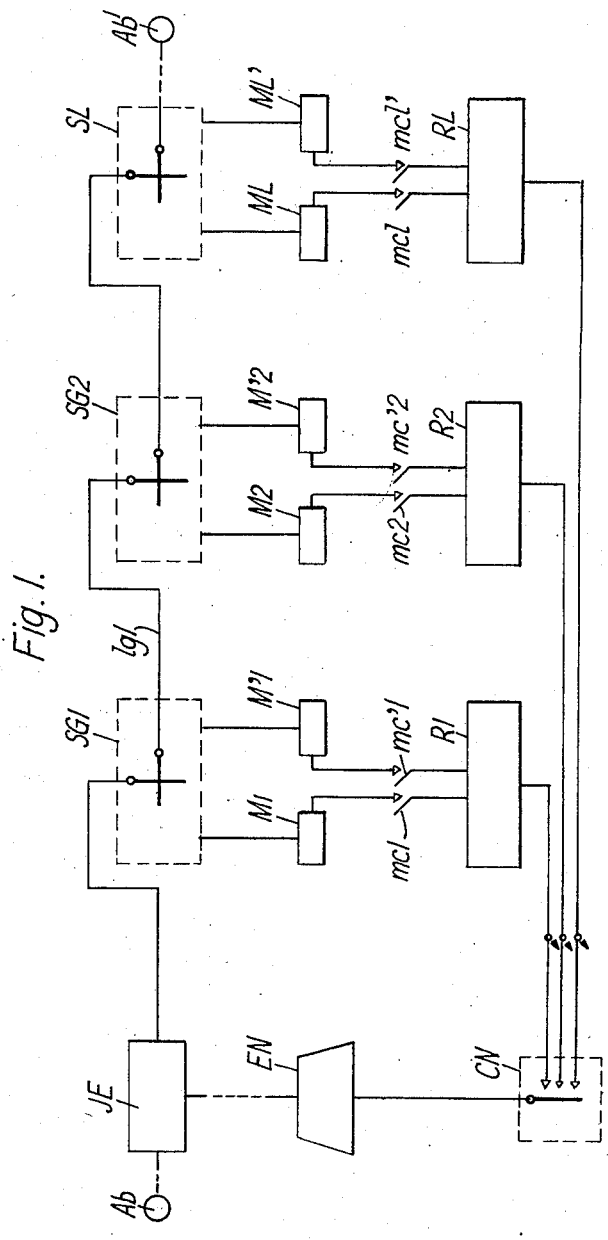
Fig. 1 is a switching diagram that allows explaining the general operation of the system.

In the switching diagrams of Figs. 1 and 2 these multiselectors are shown schematically by heavy lines perpendicular to one another and enclosed in dotted-line rectangles. Each vertical line represents an individual selector having access to a certain number of outgoing lines, each outgoing line being represented by a horizontal line. In general, the selectors individual to one and the same multiselector give access in common to the same outgoing lines. In certain cases, in order not to complicate the drawing, the individual selector is represented by a heavy vertical line and the outgoing lines by small triangles.

In order to establish a connection between two subscribers A$b$ and A$b'$ (Fig. 1), use is made of a register connector JE whose function is to establish the connection between the talking chain and register EN, an element SG1 designed to effect the first group-selection, an element SG2, to effect the second group-selection, and finally a line-selecting element SL to choose the called subscriber within his group. The chain of members used for the hunting of the calling line is neither shown nor described, since it does not form part of the invention. In each selecting element, only one multiselector individual selector is shown in order not to complicate the drawing, but it is quite obvious that two or more selectors connected in series can be used if required.

The positioning of group-selecting element SG1 can be controlled by either one of two markers M1 or M'1, the use of two markers being provided for in order to allow the simultaneous routing of two calls through one and the same group-selecting element. Likewise, group-selecting element SG2 can be controlled by either one of two markers M2 or M'2; finally, line-selecting element SL can be controlled by either one of markers ML or ML'.

The role of register EN is to receive the digits dialed by the subscriber, to translate them if need be and to send to the markers of the successive selection stages the various selective combinations required for the routing of the call. Each register is associated with an individual selector of a multiselector CN giving access to receivers R1, R2, RL. If the number of registers of the exchange exceeds the number of individual selectors of one and the same multiselector, a plurality of multiselectors CN is provided. Each impulse-receiver is multipled to the outlets of the same rank of the various frames CN, so that any register EN can have access to all the impulse-receivers of the exchange. Throughout what follows, the term "connector" will be used to designate multiselector CN and the associated control relays.

The role of an impulse-receiver consists essentially in receiving a signal characterizing the identity of a selecting element seized by the calling subscriber and hence in choosing one of the two markers serving said element. These impulse-receivers, which are very much smaller in number than the register, are divided into a plurality of groups. The impulse-receivers of the first group R1 are designed to choose one of the markers M1, M'1 serving group-selecting element SG1; the other impulse-receiver groups R2 and RL perform the same functions for group-selecting element SG2 and line-selecting element SL. Impulse-receivers RL themselves form two groups, one assigned to the elements SL serving the first half of the subscribers of the exchange and the other assigned to the line-selecting elements serving the second half of the subscribers of the exchange. A certain number of multi-contact relays are available that allow connecting the impulse-receivers two-by-two to the markers. If $n$ designates the total number of receivers and $2m$ the total number of markers, the number of these relays is equal to $n \times 2m$. In the drawing the contacts of these relays are designated by $mc1$, $mc'1$, $mc2$, $mc'2$, $mcl$, $mcl'$.

The above-described arrangements offer many advantages. The connection of an impulse-receiver and a marker is effected almost instantaneously, since it corresponds to the energization time of a multi-contact relay. This reduces to a minimum the holding period of a marker whose time is precious, and this without using a very large number of multi-contact relays, because the number of impulse-receivers in the whole exchange is rather small. Moreover, by providing the impulse-receiver with means for testing the line- or group-selecting element in calling position, the registers are simplified.

After having described the various members shown in Fig. 1, the method of routing the call will now be explained. When a subscriber A$b$ lifts his handset, he is connected by known means to a register connector JE, and then to a group-selecting element SG1. Connector JE is connected to a free register EN by any suitable means. The various digits dialed by the calling subscriber are received in the register and then translated if required. If the register has the elements required for the first group-selection, it is connected through connector CN to a free impulse-receiver R1 and then sends said receiver the selective combination required for the first group-selection.

The group-selecting element SG1 seized by calling subscriber A$b$ then sends impulse-receiver R1 a signal characterizing its identity, this signal being sent through connector JE, register EN and connector CN. When the impulse-receiver has received that signal, it chooses one of the markers M1 or M'1 serving group-selecting element SG1; the connection between the calling receiver R1 and the chosen marker M1 is effected over contacts $mc1$ of a multi-contact relay individual to said impulse-receiver and to said marker. The selective combination required for the first group-selection is thereupon sent from receiver R1 to marker M1. Group-selecting element SG1 then chooses, under the control of marker M1, a free line $lg1$ in the group corresponding to the number dialed and then is connected to that line. Marker M1 then sends a suitable signal to register EN and then releases. The register receiving this signal in turn releases impulse-receiver R1 and then is connected through connector CN to a free receiver R2 assigned to the second group-selection.

The various operations involved in the second group-selection then develop as indicated for the case of the first group-selection.

As regards the final selection, it will be noted that line-selecting element SL serves only a specific subscriber group. Hence, it is not necessary to send impulse-receiver RL an identity signal from element SL; register EN, which knows the called subscriber group, accordingly knows the identity of the group-selecting element SL involved; it is therefore it that sends this identity signal to impulse-receiver RL. This feature aside, the various operations involved in the line selection develop as in the preceding cases.

When the selection of the called subscriber has ended, and if said subscriber is free, register EN releases; the ringing current is sent as usual and the connection is established through connector JE, group-selecting elements SG1 and SG2 and line-selecting element SL.

In the foregoing descriptions only the case of a local call has been considered, but it is quite obvious that the arrangements forming the subject of the invention are applicable to incoming calls, to outgoing calls and to calls passing in transit through the particular exchange involved.

A varient of the device of Fig. 1 will now be described with reference to Fig. 2. In this device, there is no impulse-receiver between the registers and the markers; the connection is effected through an intermediate member of simplified design or selective connecting bundle FC. This bundle comprises two paths, the one I being used for sending selective combinations from the register to the marker and the other II being used to send in the opposite direction various signals relative to the progress of the call, such as the following: free subscriber, busy subscriber, selection delayed at any selection stage, etc. If it is desired to send the various selective combinations from the register to the marker almost instantaneously, it must be done in the form of codes and several wires must be used for each code. Path I therefore comprises a rather large number of wires but on the other hand is used only for a very short period of time. Path II requires only a small number of wires but must be held during the whole operating time of the marker.

It will be assumed throughout what follows that the registers are divided into $p$ groups each comprising $n$ registers; the number of markers will be designated by $2m$. There are $p$ selective connecting bundles serving each register group; each marker is multipled to the $p$ selective bundles. Consequently, any register can have access to all the markers of the exchange.

In each selective connecting bundle FC, path I consists of a set of conductors F having access to the $n$ registers of the group and to the $2m$ markers of the exchange. The connection of conductors F to a register of the group is effected by means of contacts A of a relay individual to said register; likewise, the connection of conductors F to a marker is effected by means of contact B of a relay individual to said marker. Path II consists of one or more multiselectors CN that allow connecting the registers and the markers two by two; the individual selectors of these multiselectors are connected to the registers and the outlets to the markers. According to another variant, multiselectors CN may be replaced with a set of multi-contact relays that allow connecting the registers and markers two by two.

When a subscriber A$b$ lifts his handset he is connected as in the case of Fig. 1 to a register connector JE and a group-selecting element SG1 and to a free register EN. Group-selecting element SG1 seized by the calling subscriber sends register EN a signal characterizing its identity. The selective connecting bundle FC assigned to the group of the calling register then receives two signals, one relative to the identity of the calling register and the other concerning the identity of group-selecting element SG1; it is then in a position to effect a connection between said register and one of the two markers M1, M′1 serving group-selecting element SG1.

When the selective combination required for the first group-selection has been sent from register EN to the chosen marker M1 over path I, said path is released and can be used immediately for the establishment of another connection. On the other hand, path II is held during the whole operating time of the marker. Group-selecting element SG1 then chooses, under the control of marker M1, a free line $lg1$ corresponding to the group dialed and is then connected to said line; once this has been done, said marker sends a suitable signal to the register over path II. The register receiving this signal in turn releases path II.

As has been indicated, path II can also be used as required to send other signals, such as busy subscriber, delayed selection, etc.

The various operations involved in the other selections are then performed according to the same method and the connection is then established between the calling and the called subscribers as in the case of the diagram of Fig. 1.

In order better to distribute the traffic, the first half of the $p$ selective connecting bundles FC give priority to the first marker M of each selecting element, the connecting bundles of the second half giving priority to the second marker.

Of course, the arrangements indicated in the description of Fig. 2 can be combined with those of Fig. 1. More specifically, one can associate with connector CN of Fig. 1 a by-path connection consisting of relay contacts and used to send the selective combinations from the calling register to the receiver chosen; this connection is held only during the strictly necessary time and releases immediately thereafter, connector CN being on the other hand held during the whole operating time of the marker.

Referring to Figs. 3 to 14, arranged as shown by Fig. 18, an embodiment example will now be given and a description made of the detailed operations involved in the connection of a register and a marker, corresponding to the diagram of Fig. 1.

In the schematics, the relays are represented by rectangles; the selecting magnets by rectangles crossed by a diagonal line and the connecting magnets by squares. The various relays and magnets are referenced by groups of two or three letters, the first letter being in general common to all the relays or magnets of one and the same device and the last letter identifying the relay within said device. In order to make it easier to understand the schematics, things have been arranged so that one and the same last letter will correspond to relays performing similar functions in different members. Only small letters have been used to reference the relays and selecting magnets, capital letters being reserved for the connecting magnets.

One and the same group of letters, followed by one of the digits 1 to 9, is used to designate the relays or magnets performing similar functions. Further, the contacts associated with the relays or magnets bear the same reference as the corresponding relay or magnet, followed by one of the digits 1 to 9. Thus, for example, reference $qf1$ designates the first contact of relay $qf$; reference $qa1/2$ designates the second contact of relay $qa1$, relay $qa1$ forming part of a series of relays $qa1$, $qa2$ . . . $qan$ performing similar functions.

Where several relays or magnets of one and the same series have a contact that performs one and the same function for all the relays or magnets of the series, the portion of the reference characterizing the rank of the relay or of the magnet may be omitted; thus, for example, reference $bs4$ designates the fourth contact of all the magnets $bs1$ . . . $bs28$.

In order to simplify the drawing, not all the similar members or circuits are shown, but only one or two members or circuits of each kind, their number being shown in parentheses; for example, where there are 26 selecting magnets, only one is shown.

In the detailed description that follows it will be assumed by way of example and in order to facilitate an understanding of the invention that the multiselectors used comprise 13 selecting bars, a number sufficient to select a predetermined line from among 26. In the case of the connectors CN shown in Figs. 1 and 2, the supplementary selecting bar is used as a regular selecting bar, which allows selecting two lines more, or a total of $26+2=28$ lines. Each multiselector comprises 17 individual selectors, but, as in the case of multiselector CN, only 15 are used, so as to leave an available space for the relays controlling said multiselector.

The exchange under consideration serves 10,000 subscribers, divided into 20 groups of 500. To serve these subscribers, about fifty registers are provided, divided into four connectors CN. The receivers number 28 divided into groups comprising 6 to 8 receivers each. In the first selection-stage there are 8 elements SG1, or $2 \times 8 = 16$ markers; in the second selection-stage there are also 8 elements SG2 and 16 markers; finally, there are 20 line-selecting elements SL each serving a group of 500 subscribers and controlled by $2 \times 20 = 40$ markers.

All the relays and magnets shown in Figs. 3 to 14 are assumed to be in unoperated position.

When a subscriber $Ab$ (Fig. 3) makes a call, he is connected to register connector JE through known means. This connector is connected thereupon to a free register EN through a register finder CHE. Relay $ja$ that energizes over wiper $t$ of finder CHE, wire 13 and ground. At $ja1$, $ja2$, $ja3$ it isolates the hunting chain of the calling line from the selection chain of the called line. At $ja4$ it applies ground to wire 4 in order to hold the various members located ahead of connector JE.

Relay $jb$ also energizes over contact $t1$ of finder CHE, wire 17 and ground. Over its front contacts $jb1$ and $jb3$, it establishes the continuity of wire 7 through connector JE and finder CHE.

The number dialed by the calling subscriber is received in known fashion at register EN over the following two circuits:

(1) Wire 1 (Fig. 3), contact $a$ of finder CHE, wire 10;
(2) Wire 2 (Fig. 3), contact $b$ of finder CHE, wire 11.

This number is then translated, if necessary, according to a known method.

When register EN has received the various signals required for the positioning of the first group-selecting stage SG1, contact $rt1$ (Fig. 4) closes and the following circuit is completed: battery, relay $qa1$, front $rt1$, back $qb1/1$ and $qk3$, wire 101, ground. Relay $qa1$ energizes. At $qa1/2$ it prepares the operation of relay $qb1$, which cannot energize at the instant under consideration, its two terminals being grounded; at $qa1/3$ and $qa1/4$ it prepares the sending to receiver R1 of the selective combinations required for the first group-selection; at $qa1/5$ it causes the energization of relay $qj$ over back $qk2$; at $qa1/6$ it prepares the circuit used for sending the class signal of the line to be chosen by SG1; at $qa1/7$ it prepares the circuit of the relay $bg$ designed to choose the group of impulse receivers assigned to the first selection-stage.

Relay $qj$ applies at $qj1$ a ground to general holding wire $mg1$; at $qj2$ it completes the following circuit: battery, resistance $Re1$, front contact $qj2$, wire 22, back $bv2$, right-hand winding of relay $ben$ which energizes, back $bh1$, $bg4/1$ . . . $bg1/1$, ground; at $qj3$ it prepares an energizing circuit for relays $qe$ and $bh$ and a holding circuit for relay $ben$.

Connector CN (Fig. 5) consists of a multiselector comprising 17 vertical selectors, only 15 of which are used, and 28 outlets. Each vertical selector is connected to a register EN, each outlet corresponding to an impulse receiver. Owing to the number of registers in the exchange, a plurality of similar connectors CN, CN′, CN″, CN''' have had to be provided; each impulse-receiver is multipled to the corresponding outlets of all these connectors so that any register can have access to the 28 impulse-receivers of the exchange. These 28 impulse-receivers are divided into four groups each comprising 6 to 8 impulse-receivers; the impulse-receivers R1 of the first group are assigned to the elements SG1 charged with making the first group-selection; the impulse-receivers of the second group, which are not shown in order not to complicate the drawing, are assigned to the elements charged with making the second group-selection; finally, the impulse-receivers RL of the last two groups are assigned to the line-selecting elements SL. The impulse-receivers of the third group corresponding to the line-selecting elements SL serve the first 5,000 subscribers of the exchange; the receivers of the fourth group corresponding to the line-selecting elements serve the last 5,000 subscribers of the exchange.

Connector CN comprises one relay $ben$ per register capable of being associated with said connector; the relay $ben$ energized therefore characterizes the identity of the register seized. Over its front $ben/1$ it completes the following circuit: battery, resistance $Re1$, front $qj3$, relay $qe$ which energizes, wire 21, back $bv7$, left-hand winding of $ben$, front $ben1$, . . . , back $be1/1$, right-hand winding of relay $bh$, ground; over its back $ben/1$ it prevents a similar holding circuit from being completed for the relays $be$ less well-placed with respect to the chain of back contacts $be1/1$ . . . $ben/1$; over its front $ben2$ it prepares the circuit of relays $bg$ and $bf$; at $ben3$ it prepares the energization of connecting magnet BV.

Over its front $qe1$, $qe2$ and $qe3$, relay $qe$ connects the calling register EN to connector CN; at $qe3$ it completes a holding circuit for relay $bh$.

At $bh1$, relay $bh$ opens the energizing circuit of relay $ben$, which holds over its front $ben1$ as has been indicated; it opens at the same time the holding circuit of all the other relays $be$ so that only one of said relays can hold; at $bh2$ it completes the following circuit: ground, front $bh2$, back $bs28/1$ . . . $bs3/1$, $bs2/1$, $bs1/1$, $bt8/4$, . . . $bt1/4$, relay $bf$, front $ben2$, wire 38, back $be3/2$, $be2/2$, $be1/2$, relay $bg$ which energizes, wire 19, front $qe2$, wire 90, front $qa1/7$, resistance $Re2$, battery. Relays $bg$ and $bf$ energize in series. It will be noted that the chains of contacts $be1/2$, $be2/2$, $be3/2$ . . . $ben/2$, $be2/4$, $be3/4$ . . . $ben/2$ are so arranged that the preceding circuit is completed only when one relay $be$ is in operating position. Contact $be1/2$ is multipled to four relays $bg$; the first relay $bg$ corresponds to the impulse-receivers assigned to the first group-selection; the second relay $bg$ corresponds to the impulse-receivers assigned to the second group-selection; the third relay $bg$ corresponds to the impulse-receivers assigned to the line-selecting elements serving the first 5,000 subscribers of the exchange; finally, the fourth relay $bg$ performs the same functions as the third but only for the last 5,000 subscribers of the exchange. These four relays $bg$ are connected respectively to wires 90 . . . 93. In the case under consideration, it is the first relay $bg$ that energizes, thus preparing the selection of a free impulse-receiver from among those assigned to the first group-selection. At $bh3$, relay $bh$ prepares the circuit of one of the selecting magnets $bs$.

Each connector CN has been provided with 8 relays $bt1$ . . . $bt8$, each of these relays corresponding to four impulse-receivers belonging to different groups. Each relay $bt$ is multipled to four contacts $bg2$ respectively associated with the four relays $bg$. For each relay $bg$ are thus obtained 8 wires 41, respectively corresponding to the impulse-receivers of the predetermined group. This arrangement allows having 8 impulse-receivers per group; in fact, a maximum number is here involved, since the number of impulse-receivers can be less than 8 in certain groups. Likewise, each relay $bt$ is multipled to four contacts $bg3$ associated with the four different relays $bg$, which gives a maximum of 8 selecting magnets $bs$ for a impulse-receiver group. All the impulse-receivers have their wire 40 connected to battery through cable 60; but only the free impulse-receivers have their wire 41 connected to battery over back contact $gl1$ and resistance $Re3$.

It will be assumed that the receiver of the first group corresponding to relay $bt1$ is free.

Relay $bf$ upon energizing completes the following circuit at $bf1$: ground, back $bt'''1/3$, $bt''1/3$, $bt'1/3$, front $bf1$, right-hand winding of relay $bt1$ which energizes, front $bg2$ corresponding to the impulse-receivers of the first group, wire 41, cable 60, wire 41, back $gl1$, resistance $Re3$, battery. Relay $bt1$ energizes and determines together with relay $bg$ the impulse-receiver chosen.

Relay $bt1$ completes the following holding circuit for itself at $bt1/1$: ground, front $bh3$, $bt1/1$, left-hand winding of relay $bt1$, front $bg3$, selecting magnet $bs$ which energizes, wire 40, cable 60, wire 40, battery. Over its back $bt1/1$, relay $bt1$ prevents a similar holding circuit from being completed for the other relays $bt$; at $bt1/2$ and $bt1/3$ it prevents the energization of the relays $bt$ of the same rank in connectors CN', CN'', CN''', in order to prevent one and the same impulse-receiver from being chosen simultaneously by several connectors; at $bt1/4$ it opens the energizing circuit of relay $bf$, which releases. Relay $bg$ holds across resistance $Re4$ and ground.

Selecting magnet $bs$ prepares the connection of the calling register through the impulse receiver chosen. It will be assumed that the impulse-receiver chosen corresponds to the first of the 28 magnets $bs$. Said magnet completes the following circuit over its front $bs1/1$: ground, front $bh2$, back $bs28/1$ . . . $bs3/1$, $bs2/1$, front $bs1/1$, wire 94, front $bs2$, relay $bk$, wire 40, cable 60, wire 40, battery. Wire 94 is multipled to the contacts $bs2$ respectively associated with the 28 selecting magnets $bs$; by this means are thus obtained 28 relays $bk$, respectively corresponding to the 28 impulse-receivers. In the case under consideration, it is the first relay $bk$, corresponding to the first magnet $bs$, that energizes. It will be noted that the chains of contacts $bs28/1$ . . . $bs1/1$, $bs28/1$, $bs2/3$, $bs3/3$ are so arranged that a relay $bk$ cannot be energized unless only one selecting magnet $bs$ is energized. At $bs4$, selecting magnet $bs$ prepares an energizing circuit for connecting magnet $bv$.

Relay $bk$ causes at $bk1$ the sending from the register to the impulse-receiver of the selective combinations required for the first group-selection. In the example shown it has been asumed that there were two combinations for making this selection, each of them consisting of a four-element binary code, which gives $2^4 = 16$ possibilities, only 10 of which are usually used. The sending of each combination therefore requires four wires, or one per code element. The first combination is sent over the following circuit: ground, front $qr1/1$ . . . $qr4/1$ closed according to the combination to be sent, front $qa1/3$, wires 97, front $qe1$, wires 18, front $bk1$ corresponding to the impulse-receiver chosen, wires 42, cable 60, wires 42, relays $gx1$ . . . $gx4$, battery. The second combination is sent in similar fashion but uses the four wires 96 and is received at relays $gy1$ . . . $gy4$. At $bk2$, relay $bk$ completes a holding circuit for relay $bg$.

In impulse-receiver R1, relays $gx$ and $gy$ which have operated prepare a holding circuit for themselves at $gx1$ and $gy1$; at $gx2$ and $gy2$ they cause the energization of relay $gm$ over back $gl3$; at $gx3$ and $gy3$ they prepare the sending of the two selective combinations from the impulse-receiver to the marker.

From the foregoing explanations it follows that a by-path circuit around multiselector CN has been used to send the selective combination from the register to the impulse-receiver.

Relay $gm$ of impulse-receiver R1 completes the following circuit at $gm1$: ground, front $gm1$, wire 37, cable 60, wire 37, front $bs4$ corresponding to the impulse-receiver chosen, wire 98, front $ben3$ corresponding to the calling register, right-hand winding of connecting magnet BV, wire 24, battery. Wire 98 used by this circuit is multipled to the 28 contacts *bs*4 respectively corresponding to the 28 impulse-receivers of the exchange and to the 15 contacts *be*3 respectively corresponding to the 15 registers served by connector CN.

Magnet BV causes the connection of the calling register EN to the chosen impulse-receiver R1 over contacts *a* . . . *f* of connector CN and its own front contacts *bv*3 . . . *bv*6. At *bv*1 it prepares a holding circuit for itself; at *bv*7 it opens the holding circuit of relays *ben* and *qe*, which release.

Relay *ben* upon releasing controls the release of the various relays used for controlling the positioning of connector CN. Over its front *ben*2 it opens the holding circuit of relay *bg*, which releases; at *ben*3 it removes the ground from the lower terminal of connecting magnet *bv*, which then holds over the following circuit: battery, wire 24, series windings of magnet *bv*, front *bv*1, wire 23, wire *mg*1, front *qj*1, ground. Relay *bh* releases, having its holding circuit opened at *qe*3.

Relay *bg* opens at *bg*3 the circuit of relay *bt*1 and of selecting magnet *bs*, which releases.

Selecting magent *bs* opens over its front *bs*1 and *bs*2 the circuit of relay *bk*, which in turn releases.

The relays used for controlling the positioning of connector CN are all released and can be used to establish another connection.

The calling register EN being connected to the chosen impulse-receiver R1 through connector CN, the following circuits are completed:

(1) Ground, front *qj*1 in register EN (Fig. 4), wire *mg*1, relay *qh* which energizes, wire 30, front *bv*6, contact *f* of connector CN, wire 36, cable 60, wire 36, relay *ga* which energizes, battery;

(2) Ground, back *gd*5 (Fig. 9), series windings of relay *gb*, wire 31, cable 60, wire 31, contact *a* of connector CN, wire 25, wire 14, contact *a*1 of finder CHE, wire 6, back *pv*3, (Fig. 7), relays *pg* and *ph* in series, battery; only relays *gb* and *pg* energize in the preceding circuit, relay *ph* remaining unoperated owing to the high resistance of the lower wnding of relay *gb*.

In register EN (Fig. 4) relay *qh* prepares over its front *qh*1 the circuit for the sending of the class signal of the line chosen; over its front *qh*2 it prepares the sending from the marker to the register of the various signals relative to the progress of the call (connection established, selection delayed, etc.).

In impulse-receiver R1, relay *ga* (Fig. 9) causes at *ga*1 the energization of relays *gc* and *gl*; at *ga*2 it applies a ground to general holding wire *mg*2, relays *gx* and *gy* then completing the following holding circuits for themselves: battery, relays *gx* and *gy*, front *gx*1, *gy*1 and wire *mg*2 to ground.

Relay *gb* prepares at *gb*1 a double-test circuit for the calling group-selecting element; at *gb*2 it prepares the energization of relays *gf* and of relay *gh*; at *gb*3 it allows the calling group-selecting element to send impulse-receiver R1 a signal characterizing its identity. This sending is done over the following circuit: back *ph*1 (Fig. 7), front *pg*1, back *pv*4, wire 8, front *c*1 of finder CHE, wire 16, wire 27, front *bv*3, contact *c* of connector CN, wire 33, cable 60, wire 33, front *gb*3, back *gh*1, wire 62, rectifier R*d*1, relays *gg*4 and *gg*3, ground, and, in parallel to the preceding circuit, rectifier R*d*2, relays *gg*2 and *gg*1, ground.

The identity signals thus sent from the calling group-selecting element to impulse-receiver R1 consist in currents of predetermined sign and strength that can be obtained either from batteries or from an A.C. generator associated with rectifiers. Relays *gg*1 and *gg*2 operate on currents of a predetermined sign; relays *gg*3 and *gg*4 operate on currents of the opposite sign; finally, relays *gg*1 and *gg*3, which are marginal relays, energize only on strong currents. Two currents of opposite sign can be sent in succession. Thus are obtained 8 different combinations, respectively corresponding to the 8 group-selecting elements SG1 of the exchange. These combinations can be schematized in the following table.

| Comb. No. | Code | Relays Energized |
| --- | --- | --- |
| 1 | +strong | *gg*1—*gg*2 |
| 2 | +weak | *gg*2 |
| 3 | −strong | *gg*3—*gg*4 |
| 4 | −weak | *gg*4 |
| 5 | +strong, −strong | *gg*1—*gg*2—*gg*3—*gg*4 |
| 6 | +strong, −weak | *gg*1—*gg*2 *gg*4 |
| 7 | −strong, +weak | *gg*2—*gg*3—*gg*4 |
| 8 | −weak, +weak | *gg*2 *gg*4 |

In the example shown, wire 103 of element SG1 corresponds to the code "+weak," that is to say to combination No. 2; only receiving relay *gg*2 energizes.

Relay *gc* completes the following circuit at *gc*2: battery, lower winding of relay *gk*, front *gc*2, back *gd*4, front *gb*2 and *ga*2, ground. Relay *gk*, made slow to operate owing to the short-circuit of its upper winding, does not energize at the instant under consideration.

Relay *gg*2 completes the following circuit at *gg*2/1: battery, relay *gf*, front *gg*2/1, *gb*2, *ga*2, ground. There are four relays *gf*, respectively corresponding to the four relays *gg*; in the example described, it is the second of these relays that operates.

Relay *gl* removes at *gl*1 the availability battery from the impulse receiver over wire 41; at *gl*2 it prepares a holding circuit for itself over its lefthand winding; at *gl*3 it opens the circuit of relay *gm*, which releases.

The relay *gf* energized completes a holding circuit for itself at *gf*5; over its other front contacts it prepares the selection of a free marker serving the calling group-selecting element SG1. For this purpose, the various contacts of relays *gf* are arranged in two pyramids P*y*1 and P*y*2; pyramid P*y*1 comprises one input wire 100 and 8 output wires grouped into cable 57 and respectively connected to the first 8 markers of group-selecting elements SG1; pyramid P*y*2 is made up similarly, but its 8 output wires are connected to the second markers of these same elements. Relay *gf* completes the following circuit at *gf*6: battery, upper winding of relay *gh*, front *gf*6, *gb*2, *ga*2, ground.

Relay *gh*, made slow to operate by the short-circuiting of its lower winding, energizes with a certain delay. Through the action of its back front contact *gh*1, it isolates wire 33 from relays *gg* and prepares the use of this wire for the sending of the identity signal of the marker; at *gh*2 it places the low-resistance lower winding of relay *gc* in parallel with the high-resistance upper winding of relay *gb*. If there is only one impulse-receiver seized by the frame comprising the calling selector S*e*1, the fluxes produced by the two windings of relay *gc* are equal and of opposite sign and said relay releases.

Relay *gc* upon releasing completes the following circuit at *gc*3: ground, front *gh*4, wire 63, back *gc*3, wire 99, back *gf*1/4, front *gf*2/3, back *gf*3/2, *gf*4/2, wire 2 through cable 56, back *mc*8, right-hand winding of relay *mc*', back *m*E'1, battery; at *gc*1 relay *gc* completes a similar circuit for relay *mc* of marker M1. Relays *mc* and *mc*' cut themselves off mutually over their back *mc*8 and *mc*'8; only one of these two relays can therefore hold. It will be assumed that it is relay *mc*' that holds, said relay then controlling the various operations involved in the seizure of marker M'1.

Relay *gc* (Fig. 9) upon releasing opens at *gc*2 the circuit of relay *gk*, which, made slow to operate by the short-circuiting of its upper winding, has not had time to energize.

Seizing relay *mc*' of marker M'1 connects said marker M'1 to impulse-receiver R1 over its various front contacts *mc*'3 . . . *mc*'7. Over its front *mc*'1 it completes the following holding circuit for itself: battery, relay *m*E' which energizes, back *mm*'3, front *mc*'1, left-hand winding of relay *mc'*, relay *mD'* which also energizes, back *mc*8 and the circuit already described. Marker M'1 comprises as many relays *mc'* as there are impulse-receivers to which it can be connected; over its back *mc'*1, relay *mc'* prevents similar holding circuits from being completed for the other relays *mc'* corresponding to the other impulse-receivers; this prevents two impulse-receivers from being connected to one and the same marker. Relay *mc'* completes at *mc'*3 the circuit of relay *ge* of impulse-receiver R1.

The two selective combinations recorded in impulse-receiver R1 over relays *gx*1 ... *gx*4, *gy*1 ... *gy*4 are then sent to marker M'1 over the following two circuits:

(1) Ground, front *gx*3, wires 58, front *mD'*1, relay *mx'*, battery;

(2) Ground, front *gy*3, wires 59, front *mD'*2, relay *my'*, battery.

There are four relays *mx'* respectively connected to the contacts *gx*3 of the four relays *gx*; likewise, there are four relays *my'* respectively connected to the contacts *gy*3 of the four relays *gy*. The combination recorded at relays *gx* and *gy* of receiver R1 is therefore transferred to relays *mx'* and *my'* of marker M'1.

The energization of relay *ge* tells impulse-receiver R1 that the seizure of maker M'1 has been made correctly. Contact *ge*2 doubles contact *gb*2, thus completing holding circuits for relays *gf* and *gh*; at *ge*4 relay *ge* completes a holding circuit for relays *mD'*, *mc'* and *mE'* of the marker.

In group-selecting element SG1 (Fig. 7) marginal relay *ph* is energized when the high-resistance upper winding of relay *gb* of the impulse-receiver is short-circuited; over its front *ph*1 it prepares the circuit used for sending the identity signal of the marker. As indicated, group-selecting element SG1 can be served by the two markers M1 and M'1; when one of these two markers has been chosen, a signal characterizing the identity of said marker is sent to group-selecting element SG1. This signal consists in a positive polarity for marker M1 and in a negative polarity for marker M'1. In the example described, it is marker M'1 that is chosen. The negative polarity characterizing said marker is sent over the following circuit: battery, resistance R*e*5, front *mc'*1, wire 52, front *gh*1 and *gb*3, wire 33, contact *c* of connector CN, front *by*3, wire 27, wire 16, contact *c*1 of finder CHE, wire 8, back *pv*4, front *pg*1 and *ph*1, rectifier R*d*4, relay *pj'*, back *pj*1, ground. Relay *pj'* energizes and prepares in selecting element SG1 the various operations involved in the control of the selection by marker M'1.

The various operations involved in the selection of a free line in the group dialed are thereupon performed by group-selecting element SG1 under the control of marker M'1. These operations will not be described, since they do not form part of the invention. When they have ended, contact *sn'*4 (Fig. 7), as also contact *d* of selector Sec, are closed. The class signal of the line selected is then sent to register EN over the following circuit: wire 64, contact *d* of selector Sec, front *sn'*4, wire 50, front *mc'*6, wire 34, contact *d* of connector CN, front *bv*4, wire 28, front *qh*1, *qa*1/6 and class-receiving device RC. In the example shown, it has been assumed that the class signals consisted in positive or negative polarities, or in an alternating potential, but it is quite obvious that they may consist in anything else.

The marker then tests the line chosen by known means. If this test is successful, contact *mf'*4 (Fig. 8) closes and relay *gd* energizes over the following circuit: battery, right-hand winding of relay *gd*, back *gd*2, wire 51, front *mc'*4, *mf'*4, wire 47, front *pj'*3, ground. Relay *gd* completes a holding circuit for itself over its front *gd*1, wire 61, contact *ga*2 and ground. Over its front *gd*2 it grounds wire 32, over the circuit previously described, the following circuit being then completed: wire 32 grounded, contact *d* of connector CN, wire 26, wire 15, contact *b*1 of finder CHE, front *jb*1 and *jb*3, wire 7, back *pv*2, right-hand winding of connecting magnet PV, battery. At *gd*3 it prepares the sending to the register of a signal telling it that the connection to a free line has been made.

In group-selecting element SG1 (Fig. 7), the magnet PV energized causes the closing of contacts *a*, *b*, *c*, *d* of selector S*e*1. At *pv*1 it completes the following holding circuit for itself when back *pv*2 is opened: battery, series windings of magnet PV, front *pv*1, wire 9, contact *t*1 of finder CHE, wire 17, ground. Through the opening of its back *pv*3 and *pv*4 it switches out relays *pg*, *ph* and *pj'*, whose function is now over; it also opens at *pv*3 the circuit of the lower winding of relays *gb* and *gc*, relay *gb* releasing and relay *gc* re-energizing over its upper winding. Over its front *pv*2, *pv*3, *pv*4 and *pv*5 it connects wires 6, 7, 8 and 9 to the input of selector S*e*1.

Connecting magnet SV associated with second selector S*e*2 energizes over the following circuit: battery, right-hand winding of magnet SV, back *sv*7, contact *d* of first selector S*e*1, front *pv*5, wire 9 and ground over a circuit already described. Magnet SV causes the connection through selector S*e*2 and at *sv*1 completes a holding circuit for itself over its two windings in series, input wires 6, 7, 8 and 9 of group-selecting element SG1 being then connected through selectors S*e*1 and S*e*2 to the wires 43, 44, 45 and 46 corresponding to the line selected.

When the connection has been effected through group-selecting element SG1, contact *mm'*3 (Fig. 8) is opened, this causing the release of relays *mD'*, *mc'* and *mE'* and consequently the release of marker M'1. Relay *mc'* opens at *mc'*3 the circuit of relay *ge*, (Fig. 9), which releases.

Relay *ge* upon releasing tells the impulse receiver that the release of the marker has been completed. It completes the following circuit over its back *ge*1: battery, resistance R*e*6, front *gd*3, back *ge*1, wire 35 cable 60, wire 35, contact *e* of connector CN, front *bv*5, wire 29, front *qh*2, rectifier R*d*5, lower windings of relays *qk* and *ql*, ground. Relay *qk* energizes in the preceding circuit but marginal relay *qf* remains unoperated owing to the high value of resistance R*e*6. Relay *ge* opens at *ge*2 the circuit of relays *gf* and *gh*, which release.

In register EN (Fig. 4) relay *qk* upon energizing indicates that the first group-selection has ended. Relay *qk* completes the following holding circuit for itself at *qk*1: battery, upper winding of relay *qk*, front *qk*1, *qa*1/5, wire 89 and ground; at *qk*2 it opens the circuit of *qj* which releases; at *qk*3 it removes the ground that had caused the energization of *qa*1. This relay holds and relay *qb*1 energizes over the following circuit: battery, relay *qa*1, front *qa*1/2, back *qb*1/2, relay *qb*1, wire 89, ground.

Relay *qj* upon releasing opens at *qj*1 the circuit of connecting magnet BV, as also the circuit of relays *qh* and *ga*. Register EN is thus disconnected from impulse-receiver R1.

Over its front *qb*1/1 relay *qb*1 prepares the circuit of one of the relays *qa*2 or *qa'*2 designed to control the next selection. Over its back *qb*1/2 it opens the holding circuit of relay *qa*1, which releases. Over its front *qb*1/2 it completes the following holding circuit for itself: battery, resistance R*e*7, front *qb'*1/2, relay *qb*1, wire 89, ground.

Relay *qa*1 upon releasing prepares over its back *qa*1/1 the circuit of one of the relays *qa*2 or *qa'*2. At *qa*1/5 it opens the holding circuit of relay *qk*, which releases.

In impuse-receiver R1 (Figs. 9 and 10) relay *ga* upon releasing opens at *ga*1 the circuit of relay *gc*, which releases, and the circuit of the right-hand winding of relay *gl*, which holds, as will be indicated subsequently; at *ga*2 it opens the holding circuits of relays *gd*, *gx*, *gy*, which release.

Relay *gl* has been provided to control the release of the impulse-receiver; as long as contact *ga*2 is closed, the left-hand winding of relay *gl* has its two outputs grounded and remains inactive; but as soon as this contact is opened, said relay *gl* holds over the impulse-receiver relay or relays that have not yet released. If, for example, relay *gd* is the one that has not yet released, relay *gl* holds over the following circuit: ground, front gl2, left-hand winding of relay gl, resistance Re8, wire 61, front gd1, left-hand winding of relay gd, battery. Resistance Re8 is so designed that relay gl can hold over the preceding circuit, but not relay gd. When relay gd releases, contact gd1 is open and relay gl releases, restoring at gl1 the availability battery over wire 41. Impulse-receiver R1 is fully released.

In register EN (Fig. 4) relay qk upon releasing prepares at qk3 the circuit of one of the two relays qa2 or qa'2 designed to control the second group-selection.

It will be assumed that the call is intended for a local subscriber. The second selection that must be effected must then terminate in the choice of a predetermined 500-subscriber group. Contacts ql1 and ql2 (Fig. 4) are in operating position in such a case. If register EN comprises the means required for the selection of a local subscriber group, contact rc1 is closed and the following circuit is completed: battery, relay qa'2, front rc1 and ql1, back qb2/1 and qa1/1, front qb1/1, back qk3, wire 101, ground. Relay qa'2 energizes and performs for the second group-selection the same functions as relay qa1 for the first group-selection. The various operations involved in this second selection then develop according to the same method as for the first selection; the only difference is that it is the second relay bg that energizes over wire 91 and front qa'2/7 in order to prepare the selection of a free impulse-receiver among those assigned to the second group-selection. Neither the group-selecting element SG2 nor the corresponding markers and receivers have been shown, inasmuch as they are identical with those of the first-selection stage.

As has been indicated, each local group comprises 500-subscribers. In order to effect the selection of a predetermined group, it is therefore necessary to know the thousands and the hundreds digits. Four contacts qm1/1 . . . qm4/1 are used to send the four code elements corresponding to the thousands digit. As for the hundreds digit, it is not necessary to send the four code elements; in effect, the codes corresponding to the various digits are so arranged that one code element is used to determine whether it is a question of a digit comprised between 1 and 5 or whether it is a question of one of the digits 6, 7, 8, 9 or 0; the other three elements serve to discriminate the rank of the digit within a 5-digit group. Since each local-subscriber group corresponds to the first five hundreds or to the last five hundreds of a thousand, it suffices for the selection of this group to know whether the hundreds digit is comprised between 1 and 5 or whether it is one of the digits 6, 7, 8, 9 or 0; a single code element of the hundreds digit is thus sufficient to give this information. Therefore, a single contact qc4/1 is used for sending said digit, the three wires 96 corresponding to the other code elements being grounded over front contacts ql2. This arrangement was further the subject of Letters-Patent No. 1,069,160, filed by the two applicants on December 18, 1952.

When the second group-selection has ended and register EN has received the elements required for the selection of the called subscriber within his group, contact ru1 is closed and relay qa3 energizes over the following circuit: battery, relay qa3, front ru1, back qb3/1, qa'2/1, qa2/1, front qb2/1, back qa1/1 front qb1/1, back qk3, wire 101, ground. Relay qa3 energizes and controls the various operations involved in the selection of the called subscriber within his group (line selection).

The connection of the calling register EN to a free impulse-receiver RL assigned to the line selection is made according to the method indicated for an impulse-receiver R1 assigned to the group selection, but shows a few differences with respect to the latter.

As indicated in the description of the general operation diagram, the third and the fourth impulse-receiver groups are assigned to the line selection; the third group is used in the case of subscribers belonging to one of the first five thousands of the exchange; the fourth is used in the case of subscribers belonging to one of the last five thousands. When the thousands digit dialed is 1, 2, 3, 4 or 5, contact qm4/2 (Fig. 4) is unoperated and the third relay bg (connected to wire 92) is the one that operates, thus preparing the selection of a free impulse-receiver of the third group. On the other hand, if the thousands digit is 6, 7, 8, 9 or 0, contact qm4/2 is in operating position and the fourth relay bg (connected to wire 93) is the one that operates, thus preparing the selection of a free impulse-receiver in the fourth group.

To send from register EN to impulse-receiver RL the various selective combinations required for the line selection there are three contacts qc1/1 . . . qc3/1, respectively corresponding to the first three code elements of the hundreds digit. From the explanations already given it follows that three code elements out of four are sufficient to select one hundreds from among five. The four contacts qd1/1 . . . qd4/1 are used for sending the tens digit; finally, the four contacts qu1/1 . . . qu4/1 are used for sending the units digit. For receiving these digits impulse-receiver RL comprises three relays hx, four relays hy and four relays hz, that is, a total of 11 relays. Therefore, each impulse-receiver comprises 11 wires such as 42'. The combinations received at these relays hx, hy and hz will thereupon be transferred to the marker at three relays mx', four relays my' and four relays mz'.

Further, each 500-subscriber group is served by a single and specific line-selecting element. In order to select one of the markers serving said element it suffices in impulse-receiver RL to receive the portion of the number characterizing the group comprising the called subscriber.

When register EN is connected to a impulse-receiver RL having access to the line-selecting element serving the called subscriber, relay ha (Fig. 13) energizes over a circuit similar to the circuit of relay ga of impulse-receiver RL; but, owing to the presence of the high-resistance left-hand winding of relay ha, relay qh of the register (Fig. 4) remains unoperated. Due to this, the portion of the number characterizing the called subscriber's group in the exchange is sent from register EN to impulse-receiver RL over the following circuits:

(1) Ground, generator Ge, rectifiers Rd7, Rd8, resistances Re9, Re10, front qm1/2, qm2/2, back qh1, wire 28, front bv4, contact d of connector CN, wire 34, cable 60', wire 34', back hh1, rectifiers Rd9, Rd10, relays hg3, hg4, ground;

(2) Ground, generator Ge, rectifiers Rd7, Rd8, resistance Re11, Re12, front qm3/2, qc4/2, back qh2, wire 29, front bv5, contact e of connector CN, wire 35, cable 60', wire 35', back hh2, rectifiers Rd11, Rd12, relays hg2, hg4, ground.

Relays hg1 and hg2 energize for the positive alternations, the one over wire 34' and the other over wire 35'. Relays hg3 and hg4 energize for the negative alternations, the one over wire 34' and the other over wire 35'. Contrary to what happened for relays gg1 . . . gg4 of impulse-receiver R1, there is no marginal relay among relays hg. Said relays hg can energize on any combination; since there are four relays hg, $2^4=16$ different combinations are obtained, only 10 of which are used. The impulse-receiver can in effect serve 5000 subscribers, that is, 10 groups of 500 subscribers each and consequently 10 line-selecting elements SL. Relays hg are doubled by relays hf as in the case of impulse-receiver R1, the contacts associated with relay hf forming two pyramids Py'1 and Py'2 allowing the selection of one of the two markers serving the line-selecting element having access to the called subscriber.

To send the called subscriber's group number from the register to impulse-receiver RL it suffices to send three code elements of the thousands digit and only one code element of the hundreds digit. In effect, impulse-receiver RL serves only 5 thousand subscribers and three code elements are sufficient to determine one thousands among 5. Further, a subscriber group corresponds to the hundreds 1, 2, 3, 4, 5 or 6, 7, 8, 9, 0; one code element of the hundreds digit is therefore sufficient. Contacts $qm1/2$ (Fig. 4), $qm2/2$ and $qm3/2$ correspond respectively to the three code elements of the thousands digit and contact $qc4/2$ to the single code element of the hundreds digit.

Since the signal characterizing the identity of the line-selecting element SL seized is sent from register EN and not from said line-selecting element, it is not necessary to provide in said element a relay similar to $pg$. Only one relay $ch$ is used to switch in the relays $cj$ and $cj'$ which receive the identity signal of the marker selected.

When the called subscriber's group number has been received at relays $hf$ of receiver RL, relay $hh$ energizes over front contact $hf7$ and short-circuits at $hh6$ the high-resistance left-hand winding of relay $ha$; owing to this, marginal relay $qh$ of register EN energizes and the following operations develop as in the case of the group selection.

It will be noted that the high-resistance left-hand winding of relay $ha$ is short-circuited by $hd4$ until the release of the impulse-receiver, in order to prevent the premature release of relay $qh$ in the register, which would prevent the operation of relay $qk$.

When the selection of the called subscriber, assumed to be free, has ended, the ground is removed from wires 89 (Fig. 4), 101, 13 and 17. Relays $qb1 \ldots qb3$ release, as also relay $ja$ in connector JE. Connector JE is disconnected from register EN and the ringing current is sent to called subscriber A$b'$ by known means. Relay $jb$, as also connecting magnets PV, SV, CV, TV, hold over wire 102 and ground. Wire 4 used for holding members located ahead remains grounded over front contact $jb2$. When the called subscriber answers, he is connected to calling subscriber A$b$ over the circuit represented by heavy dashes in connector JE, group-selecting element SG1 and line-selecting element SL.

When the connection has ended, the ground is removed from wire 102, this causing the release of relay $jb$, as also the release of all the members located after connector JE; contact $jb2$ opens and the members located ahead release in turn.

It will now be assumed that the second group-selection is used for other purposes than the routing of a local call. It can be used for example for selecting a free outgoing circuit to a distant exchange, a free line to a predetermined special service, etc. Under these conditions, contacts $ql1$ and $ql2$ (Fig. 4) are in unoperated position. When the register has received the elements required for the second group-selection, contact $rt2$ is closed and relay $qa2$ energizes over the following circuit: battery, relay $qa2$, front $rt2$, back $ql1$, $qb2/1$, $qa1/1$, front $qb1/1$, back $qk3$, wire 101, ground. Relay $qa2$ energizes and performs for the second group-selection the same functions as relay $qa'2$ in the case of the selection of a local subscriber group. The only difference as compared with this latter case is that two appropriate translated combinations are sent instead of sending code elements of the thousands and hundreds digits. Four contacts $qt1/1 \ldots qt1/4$ are used for the first combination and four contacts $qt'1/1 \ldots qt'1/4$ for the second combination. It will be noted that the same relay $qb2$ is switched in whether or not it is a question of a call intended for a local subscriber.

In low-capacity exchanges a single group-selection may suffice in the case of a local call; provision is then made for a supplementary switching, which occurs after said selection, to eliminate relay $qa'2$ and cause the immediate energization of the relay $qa3$ controlling the various operations involved in the line selection.

After having discussed the general case, the various special cases that can arise during the routing of the call will now be examined in succession.

If two or more registers EN try to be connected simultaneously to one and the same connector CN, all the $be$ relays belonging to said registers energize, but relay $bh$ also energizes and at $bh1$ breaks the energizing circuit of said relays $be$. Only one of these relays holds over its front $be1$ and through its corresponding back contact opens the holding circuit of the other relays less well located with respect to the chain of contacts $be1/1 \ldots ben/1$. In the example shown it is the relay $be$ located the farthest to the left that has priority. Only one register EN is therefore connected to connector CN, the calls received at the other registers being held waiting until all the relays controlling the positioning of said connector CN have released. It will be noted that two relays $be$ can be energized simultaneously for a short instant, but the chains of contacts $be1/2 \ldots ben/2, be2/4, be3/4$ are so arranged that the energization of relays $bg$ and $bf$ cannot occur while two relays $be$ are in operating position. Any double connection of two registers to one and the same connector CN is therefore rendered impossible.

If a relay $bk$ is energized when connector CN is seized by register EN, relay $bf$ is short-circuited by $bk2$ and the sequence of operations cannot occur.

If all the impulse-receivers of the wanted group are busy, all the contacts such as $gl1$ (Fig. 10) are open and no relay $bt$ can energize. The call is held waiting until one of the impulse-receivers of the wanted group becomes available.

If two connectors CN attempted to seize one and the same impulse-receiver simultaneously, any double connection would be rendered impossible due to the fact that the energizing circuit of a relay $bt1$ is broken by the back contacts $bt'1/3, bt''1/3, bt'''1/3$ associated with the relays $bt1$ of the same rank in connectors CN$'$, CN$''$, CN$'''$.

The various first selectors Se1 of group-selecting element SG1 are grouped into one or more multiselectors or "frames." Two calls cannot be routed simultaneously through one and the same frame of first selectors Se1 because of the very composition of a multiselector, since each of said multiselectors comprises only one set of selecting magnets. Means must therefore be provided to prevent the possibility of two impulse-receivers R1 being seized simultaneously by one and the same frame of first selectors. In such a case, the low-resistance lower winding of relay $gc$ of one of the receivers is shunted by the similar winding of relay $gc$ in the second impulse-receiver; due to this, both relays $gc$ hold in both impulse-receivers, the flux of the upper winding prevailing. Any seizure of the marker is impossible, owing to the opening of back contacts $gc1$ and $gc3$. After a predetermined lapse of time, relay $gk$ of one of the impulse-receivers, made slow to operate by the short-circuiting of its upper winding, ends by energizing over the following circuit: battery, lower winding of relay $gk$, front $gc2$, back $gd4$, front $gb2$ and $ga2$, ground. Relay $gk$ removes the short-circuit of its upper winding at $gk1$, this making it fast to release. At $gk2$ it makes a break in the test circuit of wire 31. In the second impulse-receiver, relay $gc$ is no longer shunted; the fluxes produced by its two windings being equal and of opposite sign, this relay releases and the various operations develop as in the general case.

In the first impulse-receiver, relay $gc$ re-energizes over its upper winding and relay $gb$ releases, because it cannot hold in parallel with the low-resistance lower winding of relay $gc$ of the second impulse-receiver. Relay $gb$ opens at $gb2$ the circuit of relay $gk$, the circuit of relays $gf$ and the circuit of relay $gh$. All these relays release. The impulse-receiver is then back in the same condition as before the energization of relay $gb$.

When the second impulse-receiver is disconnected from the frame of first selectors Se1, the impulse-receiver under consideration again tests said frame and the cycle of the next operations is repeated according to the same method.

If the first group-selection is not made within a predetermined period of time, marker M'1 closes its contact mr'1 (Fig. 8) and the following circuit is completed; positive polarity, resistance Re13, front mr'1 and mc'5, wire 54, front ge1, wire 35, cable 60, wire 35, contact e of connector CN, front bv5, wire 29, front qh2, rectifier Rd6, lower winding of relay qg, ground. Relay qg energizes and by any suitable means causes the cancellation of all the selection operations until then effected. The connection between the register and the marker is released and said register is connected to another impulse-receiver, thus making a new selection attempt through other members.

The operation is the same if a delayed line-selection is involved.

If the called subscriber is busy, marker ML' closes its contact mq'1 (Fig. 12) and the following circuit is completed: battery, resistance Re14, front mq'1, back mr'1, front mc'5, wire 77, front hh2, wire 35', cable 60', wire 35, contact e of connector CN, front bv5, wire 29, front qh2, rectifier Rd5, lower windings of relays qk and qf, ground. Owing to the low value of resistance Re14, marginal relay qf energizes in series with relay qk. Relay qf completes a holding circuit for itself at qf1 and by any suitable means causes the sending of the busy signal to the calling subscriber.

It has been assumed in the preceding descriptions that frames CN, CN', CN'', CN''' gave access in common to the same impulse-receivers, that is, that they formed a single subdivision; if required, a plurality of subdivisions of connectors CN may be provided, each serving a predetermined set of impulse-receivers.

Referring to Figs. 15 to 17, arranged in accordance with the association plan of Fig. 19, a description will now be given of the register-marker connecting device corresponding to the diagram of Fig. 2. As has been indicated, it is a question of connecting the calling register EN to one of the two markers M controlling the seized group- or line-selecting element. There are p groups of n registers and 2 m markers. The connection is provided through two paths I and II. In the example shown, the first comprises 20 wires 148; it is used only for sending the various selective combinations from the register to the marker and is released as soon as it has been ascertained that this sending has been done correctly. Path II comprises only 4 wires 146 and allows the marker to send the register various signals concerning the progress of the call: subscriber free, subscriber busy, delayed selection, etc. It is therefore held until the release of the marker.

Shown at EN are such circuit components of a register as are required for an understanding of the invention, at M1 the circuit components of a marker and at FC1 the schematic of a selective connecting bundle designed to connect the register to the marker. There are p connecting bundles. At FC1 is shown the complete schematic of the first of these bundles and at $FC_p$ the circuit components of the last bundle. Each of these bundles serves a group of n registers. The two markers of a pair are designated by M1 and M2.

The relays mca and mcb respectively designed to effect the connection of the calling register and of the marker selected have been placed in said register and in said marker, although they actually form part of connecting bundle FC. Rectangles CE and CM show the portions of the registers and markers between which the signal exchanges are made.

Device AT allows routing waiting calls in a predetermined order.

It will be assumed that the calling subscriber is connected to a register EN and to a group-selecting element of the first stage. Register EN being seized, contacts esp1, esp2 (Fig. 16) are closed. There are m contacts such as ecs; one of them is in operating position and characterizes the identity of the calling group-selecting element, which will allow the selection of one of the two markers serving this element.

When a marker M1 is available, all its relays are de-energized, except for relay mx (Fig. 15), which holds over circuits represented schematically by CMZ.

If at least one of the two markers serving the calling group-selecting element is available, the following circuit is completed: battery, resistance Re40 (Fig. 12), front esp1, relay exx which energizes, back v3, wire 132, front ecs, right-hand winding of relay fca, front mx1, in the one or the two free markers, ground. There are m relays fca, that is, one for each selecting element or, what amounts to the same thing, one for each pair of markers. Relay fca cannot energize, owing to the high resistance of the winding of relay exx. Relay exx completes the following circuit at exx1: battery, relay exa which energizes, front exx1, wire 140, back ga3, ground.

Relay exa completes the following holding circuit for itself at exa1: battery, relay exa, front exx1 and exa1, back v2, ground. At exa2 it causes the operation of relay ga. At exa3 it prepares the energizing circuit of relay mca. At exa4 it prepares a holding circuit for this same relay mca.

Relay ga prepares an energizing circuit for relay mca at ga1. At ga2 it completes the following circuit: battery, resistance Re41 (Fig. 16), front exa2, wire 141, front ga2, resistance Re42, relay gb which energizes, chain of back contacts ss28/1 . . . ss1/1, ground. Through the opening of its contacts ga4 . . . ga(n+2) it prevents the operation of relay exa in the other registers of the same group. Calls received at these registers are therefore held waiting.

Relay gb completes at gb1 the following circuit for relay mca (Fig. 12): battery, relay mca, back mcc1, front exa3, wire 142, front ga1, gb1 and ground.

Relay mca connects the register involved to connecting bundle FC1. It prepares a holding circuit for itself at mca1; at mca2 and mca4 it completes a second holding circuit for relay exa: battery, relay exa, front mca4, exa1, mca2, ground. At mca5 and mca9 it prepares the operation of connecting magnet V of the individual selector CICN associated with the calling register. At mca6 it places a low resistance Re42 in parallel with high-resistance relay exx, the effect of this being to cause the operation of relay fca in connecting bundle FC1 while allowing the holding of relay exx. At mca7 it prepares the circuit of one of the two relays fcm or fcm'. At mca10 . . . mca29 it prepares the continuity of the path I to be used for sending from the register to the marker the selective combinations required for the routing of the call.

The relay fca dependent on the contact ecs closed characterizes the identity of the calling group-selecting element, hence of the pair of markers to be selected. It prepares a holding circuit for itself at fca1. At fca2 it completes the following circuit: battery, resistance Re43, front mca7, fca2, back fcm'4, relay fcm which energizes, back fcm2, wire 133, front mx3 assumed closed if the first of the two markers serving the calling group-selecting element is available, back fcm3 of connecting bundle $FC_p$, wire 134, back fcm3 of connecting bundle FC1, ground.

There are m pairs of relays fcm, fcm'; each of these pairs corresponds to one relay fca and hence to one predetermined pair of markers. Each relay fcm corresponds to the first marker and each relay fcm' to the second marker of a pair. The relay fcm energized therefore indicates that the first of the two markers associated with the calling group-selecting element is the one selected.

Relay fcm causes the energization of relay mcb over its front *fcm*1; over its front *fcm*2 it completes a holding circuit for itself; over *fcm*4 it prevents any operation of the relay *fcm'* corresponding to the second marker.

Relay *mcb* characterizes the seizure of the marker selected. At *mcb*1 it completes the following holding circuit for relay *mca*: ground, front *mcb*1, *mca*1, *exa*4, wire 143, front *ga*1, wire 142, front *exa*3, back *mcc*1, relay *mca*, battery. At *mcb*2 it causes the operation of the selecting magnet *ss* corresponding to the marker selected. At *mcb*3 it completes the following holding circuit for relay *fca*: ground, front *mcb*3, left-hand winding of relay *fca*, front *fca*1 and *mca*7, resistance R*e*43, battery. At *mcb*5 it acts on device CMZ2 which causes the release of availability relay *mx*. Over its contacts *mcb*7 ... *mcb*26 it establishes the continuity of path I between register EN and marker M1: front *mca*10 ... *mca*29, front *mcb*7 ... *mcb*26. This path I will allow sending several selective combinations from register EN to marker M1 almost instantaneously. The latter now has all the information required for the positioning of the group-selecting element controlled by it.

Selecting magnet *ss* upon energizing prepares the connection of individual selector CICN to the marker selected. At *ss*1/1 it opens the circuit of relay *gb*, which releases. At *ss*2 it completes the circuit of connecting magnet V: ground, lower winding of said magnet, front *mca*9, *ss*2, *mca*5, *esp*1, resistance R*e*40, battery.

Connecting magnet V upon energizing establishes the continuity of path II between the calling register and the marker selected: front *v*4 ... *v*7, contacts of individual selector CICN, wires 146. This path comprises only 4 wires; it is used by the marker to send the register certain information concerning the progress of the call, such as subscriber free, subscriber busy, selection not effected within the time allowed, etc. At *v*1 connecting magnet V prepares a holding circuit for itself through its two windings in series; at *v*3 it opens the circuit of relay *exx*, which releases, but without further results.

When the various selective combinations required for the routing of the call have been received at the marker, the latter sends the register, according to a known method, an acknowledgment-of-receipt signal in order to allow said register to check whether the signals it has sent have been received correctly. This acknowledgment of receipt is sent over path I and can for example consist of the same selective combinations as those sent by the register. This check having been made, contact *mir* (Fig. 16) is closed and the following circuit is completed: battery, relay *cs*, front *mir*, device CM, one of wires 146, individual selector CICN, one of front contacts *v*4 ... *v*7, device CE, wire 145, relay *ers*, front *esp*2, ground. Relay *ers* energizes and at *ers*1 completes the circuit of relay *mcc*.

Relay *mcc* gives the release signal of path I. At *mcc*1 it opens the circuit of relay *mca*, which releases.

Relay *mca* opens at *mca*2 and *mca*4 the circuit of relay *exa*, which releases; at *mca*7 it opens the circuit of relays *fcm* and *fca*; at *mca*10 ... *mca*29 it releases path I, whose function is now ended.

Relay *exa* opens at *exa*2 the circuit of relay *ga*, which releases.

Relay *fcm* opens over its front *fcm* the circuit of relay *mcb*, which releases.

Relay *mcb* opens at *mcb*2 the circuit of selecting magnet *ss*, which releases.

Path I is released, only path II being held. All the relays used for establishing the two paths de-energize and can be used by another register. Only the connecting magnet V which ensures the holding of path II remains operated through *v*1, *esp*1, resistance R*e*40 and battery.

When the marker has fully completed its function, it signals the register over path II; the latter then causes the opening of the two contacts *esp*1 and *esp*2. Connecting magnet V, having its holding circuit opened at *esp*1, releases. The contacts of individual selector CICN are opened and path II is released in turn. When the marker is fully released, device CMZ causes the re-energization of availability relay *mx*.

The register now receives a signal characterizing the identity of the next selecting element, which is translated into the closing of a contact *ecs*, and then according to the same method chooses one of the markers serving said element.

The various special cases involved in the connection of the register and the marker will now be discussed. It has been assumed in the preceding descriptions that the first marker of the desired pair was available, this marker being then chosen by relay *fcm*. If the marker is busy, its relay *mx* is unoperated, contact *mx*3 (Fig. 17) is open and relay *fcm* cannot energize. Relay *fcm'* then operates over the following circuit: battery, resistance R*e*43 (Fig. 15,), front *mca*7 and *fca*3, back *fcm*4, relay *fcm'*, back *fcm'*2, back *mx*2 closed because the first marker is busy, front *mx*3 closed in the second marker M2 if the latter is available, back *fcm'*3 of bundle FC1, wire 137, back *fcm'*3 of bundle FC$_p$, ground. Relay *fcm'* performs a function similar to that of relay *fcm* but it causes the seizure of marker M2 over the following circuit: ground, back *fcm'*1 (Fig. 17), wire 139, front *fcm'*1 and relay *mcb* (not shown) of the second marker.

As follows from the preceding explanations, connecting bundle FC1 gives priority to marker M1, marker M2 being seized only if M1 is busy. The same arrangement has been adopted in the first half of the *p* connecting bundles. In the second half, however, priority is given to marker M2, marker M1 being seized only in case M2 is busy. Thus, for example, if marker M2 is available, the contact *mx*3 (Fig. 15) corresponding to this marker is closed and relay *fcm'* of connecting bundle FC$_p$ (Fig. 17) controlling the seizure of said marker energizes over the following circuit: battery, resistance R*e*43 in connecting bundle FC$_p$, front *mca*7, *fca*3, back *fcm*4, relay *fcm'*, back *fcm'*2, wire 136, front *mx*3 of marker M2, back *fcm'*3, wire 137, back *fcm'*3, ground. If only marker M1 is available, contact *mx*2 of marker M2 is unoperated and contact *mx*3 of marker M1 is operated. Relay *fcm* controlling the seizure of marker M1 is energized over the following circuit: battery, resistance R*e*43 in connecting bundle FC$_p$ (Fig. 17), front *mca*7, *fca*2, back *fcm'*4, relay *fcm*, back *fcm*2, back *mx*2 of marker M2, front *mx*3 of marker M1, back *fcm*3, wire 134, back *fcm*3, ground.

If both markers are busy, the call is held waiting until one of them becomes available.

When a register is in calling position, the relay *ga* common to the registers of one and the same group energizes as has been indicated; contacts *ga*4 ... *ga*(*n*÷2) are open. As from this moment, the relays *exa* of the other registers of said group cannot operate and calls received at said registers are held waiting.

When the various relays that control the establishment of the register-marker connection have released, contacts *ga*4 ... *ga*(*n*÷2) are again closed and the waiting call or calls can then be put through. If there are several calls waiting, all the relays *exa* of the corresponding registers energize, but only the relay *mca* nearest waiting device AT can energize over front *exa*3, the corresponding back contact *exa*3 preventing the operation of the other relays *mca*. It can therefore be seen that there are two quite different priorities for the routing of waiting calls, one being a time priority, consisting in serving the first calling register, and the other a space priority, consisting, in the case of simultaneous calls, in serving the register nearest device AT.

If there is a call waiting at a register and both markers capable of handling that call are busy, the relay *exx* having its circuit opened at *mx*1 releases, opening at *exa*1 the holding circuit of relay *exa*. This relay cannot re-energize while back *ga*3 is open, that is, until all calls waiting at the instant under consideration have been handled. The register loses its turn in the waiting line.

It will be noted that the relay $gb$ controlling the energization of the register connecting-relay $mca$ cannot operate unless all the selecting magnets have homed (chain $ss1/1 \ldots ss28/1$ closed) and unless the relay $mca$ corresponding to the preceding call has returned to normal, as otherwise $gb$ would be short-circuited over contacts $mca3$ and $gb2$.

It will also be noted that, in a connecting bundle of a predetermined rank, FC1 for example, the relays $fcm$ and $fcm'$ corresponding to the two markers of one and the same pair cut themselves off mutualy at $fcm4$ and $fcm'4$ in order to prevent the simultaneous seizure of these two markers. Further, each relay $fcm$ of a connecting bundle FC has its energizing circuit broken by back contacts of all the relays $fcm$ of the same rank of the other connecting bundles; thus, for example, the energizing circuit of relay $fcm$ of connecting bundle FC1 is broken by back contact $fcm3$ of connecting bundle $FC_p$. If several registers call simultaneously in different groups the connecting bundles corresponding to these groups are seized, but they cannot seize one and the same marker.

In the multiselector consisting of individual selectors CICN no use is made of the separating bar, which would work intensively and would risk creating a weak point in the frame. Therefore, this multiselector gives access to only 28 outlets. If the total number of markers of the exchange exceeds 28, the broken-line connections are eliminated and the dotted-line connections are made; contact $mcb2/6$ (Fig. 16) is wired, but only in the second marker of each pair. The operations develop as follows. If the first marker of the pair is selected, nothing is changed with respect to the method for the general case, with the sole difference that path II is established over back contacts $fex3 \ldots fex6$. If the second marker of the pair is chosen, contact $mcb2/6$ is closed in said marker and the following circuit is completed: battery, resistance $Re45$, front $mcb2/6$, right-hand winding of relay $fex$, front $mca8$, ground. Relay $fex$ energizes. At $fex1$ it completes the following holding circuit for itself: ground, left-hand winding of relay $fex$, front $fex1$, $esp1$, resistance $Re40$, battery. Over its front $fex3 \ldots fex6$ it prepares the routing of the register to the second marker of the pair. When connecting magnet V energizes, path II is established over front $v4 \ldots v7$, $fex3 \ldots fex6$ and the contacts of individual selector CICN. Relay $fex$ remains energized in parallel with connecting magnet V and thus maintains the continuity of path II until the release of the marker. When the register is disconnected from the marker, relay $fex$ releases at the same time as connecting magnet V.

The two marks $(2m)$, $(m)$ placed opposite wires 146 and 147 mean that, where relay $fex$ is not used, there are as many groups of wires 146 as there are markers in the exchange, namely $2m$; otherwise, there are $m$ groups of wires 146 corresponding to the first markers of the various pairs and $m$ groups of wires 147 corresponding to the second markers of these same pairs.

It is quite obvious that the preceding descriptions have been given only as a nonlimitative example and that numerous modifications could be introduced without departing from the scope of the invention. It would be possible to arrange the subscribers otherwise than in groups of 500, to provide crossbar switches comprising selecting magnets differently arranged or of different capacity, and to use other code systems. Specifically, all the numerical data, which depend essentially upon the traffic, have been given only as an example to make it easier to understand the operation and could be revised without in any way changing the features of the invention.

What is claimed is:

1. An automatic telephone system comprising a plurality of lines, means including selecting elements for connecting a calling line with a called line, a plurality of registers, means responsive to a signal on a calling line for connecting said calling line to a free register and to a free selecting element, a plurality of impulse-receivers, there being at least one impulse-receiver associated with each selecting element, the number of said impulse-receivers being less than the number of said registers, means responsive to a digit stored in a register for connecting said register to a free receiver associated with the connected selecting element, means responsive to a selective combination of digits stored in said register and required for the operation of said connected selecting element for storing said combination of digits in the connected impulse-receiver to said register, means in each selecting element for transmitting a signal to a connected impulse-receiver characteristic of the identity of said selecting element, a plurality of markers associated with each impulse-receiver, means in each impulse-receiver responsive to said signal for selecting one of the associated markers and connecting to it, means controlled by the impulse-receiver connected with the selected marker for causing the selected marker to operate the selecting element connected to said register in accordance with the combination of digits stored in said impulse-receiver, and means for releasing said selected marker upon the completion of the selection by said selection element.

2. An automatic telephone system, as defined in claim 1, in which the selecting elements are divided into groups, each group representing a selecting stage and in which the impulse-receivers are also divided into groups, each group of impulse-receivers being assigned to a predetermined selection stage, and the means for connecting a register with a impulse-receiver responsive to a digit stored in said register includes means for selecting a free impulse-receiver among those of a group corresponding to the particular selection involved.

3. An automatic telephone system, as defined in claim 2, in which one group of selecting elements is a line selecting stage and the impulse-receivers assigned to the elements of this stage are divided into a plurality of subgroups, the impulse-receivers of each subgroup giving access to line selecting elements serving a predetermined subscriber group.

4. An automatic telephone system, as defined in claim 3, further comprising means in each register for transmitting the signal characteristic of a line selecting element to a connected impulse-receiver associated with said line selecting element.

5. An automatic telephone system, as defined in claim 1, in which the means for connecting a register to a impulse-receiver comprises a switching device adapted to provide one connection only at a single instant.

6. An automatic telephone system, as defined in claim 1, further comprising means in each marker for sending a signal characterizing its identity to the associated selecting element over the same circuit used for sending the selecting-element-identifying signal to the associated impulse-receiver.

7. An automatic telephone system, as defined in claim 1, in which the selecting elements are multiselectors, further comprising means responsive to the seizure of two impulse-receivers by two individual selectors of the same multiselector for preventing the operation of one of said two impulse-receivers so as to prevent the simultaneous routing of two calls through said multiselector, and means for holding the call received at the unoperated impulse-receiver during the whole operating time of the other impulse-receiver.

8. An automatic telephone system comprising a plurality of lines, means including stages of selecting elements for connecting a calling line with a called line, a plurality of registers, means responsive to a signal on a calling line for connecting said calling line to a free register and to a selecting element in a first stage, means in each selecting element responsive to the connection thereof to a calling line for transmitting a signal characteristic of the identity of said selecting element to the connected register, a plurality of markers serving each selecting element stage a plurality of switch means accessible to said registers, means in each register for seizing a switch means when said register is seized, means in a seized register responsive to the identifying signal received from a connected selecting element for causing the seized switch means to choose a free marker serving the stage of the seized selecting element and to connect to said marker, means in each register to set a seized marker in accordance with selective signals stored in said register, means for causing said marker, thus set, to operate said connected selecting element in accordance with said selective signals, and means for releasing said marker upon the completion of the operation of said selecting element.

9. An automatic telephone system, as defined in claim 8, in which the registers are divided into a plurality of groups, each of the plurality of switch means being assigned to a separate register group and having access to all of the markers.

10. An automatic telephone system, as defined in claim 9, in which each switch means comprises a plurality of switch devices divided into classes for selecting the markers, and means connected with each class of switch devices for causing a different priority of selection of said markers.

11. An automatic telephone system, as defined in claim 8, in which each switch means comprises first and second circuits for connecting a register to a marker, said first circuit being connectable to the means in the register for setting the seized marker in accordance with the selective signals stored in said register, means for releasing said first circuit as soon as the marker is set, said second circuit being used for signals relating to the progress of the call, and means for holding said second circuit during the whole operating time of the marker.

12. An automatic telephone system, as defined in claim 11, in which the means for causing a seized switch means to choose a free marker and to connect to it comprises a multiselector, and relay means included in the first circuit for controlling the positioning of said multiselector, the second circuit comprising the cross points of said multiselector.

References Cited in the file of this patent

UNITED STATES PATENTS

| | | |
|---|---|---|
| 2,520,962 | Retallack | Sept. 5, 1950 |
| 2,522,000 | Shepherd | Sept. 12, 1950 |